United States Patent
Tatsuda

(10) Patent No.: US 11,323,575 B2
(45) Date of Patent: May 3, 2022

(54) PRINTING ABNORMALITY DETECTION SYSTEM AND METHOD WITH DISPLAY BASED ON NECESSITY DETERMINATION CRITERIA

(71) Applicant: Seiko Epson Corporation, Toyko (JP)

(72) Inventor: Tetsuo Tatsuda, Ina (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/336,363

(22) Filed: Jun. 2, 2021

(65) Prior Publication Data
US 2021/0385338 A1    Dec. 9, 2021

(30) Foreign Application Priority Data

Jun. 3, 2020    (JP) .............................. JP2020-096765

(51) Int. Cl.
*H04N 1/00*    (2006.01)
(52) U.S. Cl.
CPC ..... *H04N 1/00076* (2013.01); *H04N 1/00005* (2013.01); *H04N 1/00015* (2013.01); *H04N 1/00023* (2013.01); *H04N 1/00037* (2013.01); *H04N 1/00039* (2013.01); *H04N 1/0044* (2013.01); *H04N 1/00814* (2013.01)
(58) Field of Classification Search
None
See application file for complete search history.

(56) References Cited

U.S. PATENT DOCUMENTS

2008/0151307 A1    6/2008  Minamida et al.
2009/0279108 A1*  11/2009  Hoshi ................ G06K 15/1889
                                                    358/1.2

FOREIGN PATENT DOCUMENTS

JP    2008-160284 A    7/2008

\* cited by examiner

*Primary Examiner* — Scott A Rogers
(74) *Attorney, Agent, or Firm* — Harness, Dickey & Pierce, P.L.C.

(57) ABSTRACT

A printing abnormality detection system includes a printer that prints an image on a printing medium based on image data, a reader that reads the image printed on the printing medium, a processing unit that detects an abnormal printed portion based on read image data from the reader, a storage unit that stores information of a display necessity determination criterion, and a display unit. The processing unit determines, based on the image data, the read image data, and the display necessity determination criterion, whether the abnormal printed portion is to be displayed on the display unit. When the processing unit determines that the abnormal printed portion is to be displayed, the processing unit executes a process of displaying, on the display unit, abnormal printed portion information including an image of the abnormal printed portion.

11 Claims, 19 Drawing Sheets

FIG. 16

| CATEGORY OF PRINTER | | | TEXTILE PRINTING | | |
|---|---|---|---|---|---|
| APPLICATIONS OF PRINTER | | | LUXURY CLOTHES | NORMAL CLOTHES | CLOTH |
| INK DROPPING | SIZE | | 0.5 mm OR LARGER | 1 mm OR LARGER | 2 mm OR LARGER |
| | NUMBER OF PORTIONS | | 1 OR LARGER | 1 OR LARGER | 1 OR LARGER |
| | COLOR | | ΔE: 3.0 OR LARGER | ΔE: 5.0 OR LARGER | ΔE: 7.0 OR LARGER |
| SCRATCH | SIZE | | 0.5 mm OR LARGER | 1 mm OR LARGER | 2 mm OR LARGER |
| | NUMBER OF PORTIONS | | 1 OR LARGER | 1 OR LARGER | 1 OR LARGER |
| | COLOR | | ΔE: 3.0 OR LARGER | ΔE: 5.0 OR LARGER | ΔE: 7.0 OR LARGER |
| LACK OF DOT | SIZE | | 0.5 mm OR LARGER | 1 mm OR LARGER | 2 mm OR LARGER |
| | NUMBER OF PORTIONS | | 1 OR LARGER | 1 OR LARGER | 1 OR LARGER |
| | COLOR | | ΔE: 3.0 OR LARGER | ΔE: 5.0 OR LARGER | ΔE: 7.0 OR LARGER |
| INK SCATTERING | SIZE | | 0.5 mm OR LARGER | 1 mm OR LARGER | 2 mm OR LARGER |
| | NUMBER OF PORTIONS | | 1 OR LARGER | 1 OR LARGER | 1 OR LARGER |
| | COLOR | | ΔE: 3.0 OR LARGER | ΔE: 5.0 OR LARGER | ΔE: 7.0 OR LARGER |
| UNEVENNESS (STREAK) | SIZE | | 0.5 mm OR LARGER | 1 mm OR LARGER | 2 mm OR LARGER |
| | NUMBER OF PORTIONS | | 1 OR LARGER | 1 OR LARGER | 1 OR LARGER |
| | COLOR | | ΔE: 3.0 OR LARGER | ΔE: 5.0 OR LARGER | ΔE: 7.0 OR LARGER |
| INK BLEEDING | SIZE | | 0.5 mm OR LARGER | 1 mm OR LARGER | 2 mm OR LARGER |
| | COLOR | | ΔE: 3.0 OR LARGER | ΔE: 5.0 OR LARGER | ΔE: 5.0 OR LARGER |
| DISTORTION | SHAPE | | 2% OR HIGHER | 3% OR HIGHER | 5% OR HIGHER |
| DISPLAY NECESSITY DETERMINATION CRITERIA | | | | | |

PRINTING ABNORMALITY DETECTION SYSTEM AND METHOD WITH DISPLAY BASED ON NECESSITY DETERMINATION CRITERIA

The present application is based on, and claims priority from JP Application Serial Number 2020-096765, filed Jun. 3, 2020, the disclosure of which is hereby incorporated by reference herein in its entirety.

BACKGROUND

1. Technical Field

The present disclosure relates to a printing abnormality detection system, a printing abnormality detection method, and the like.

2. Related Art

It may take long time for a user of a printer to perform screening on all results of printing by visual inspection and determine the printing quality, and a problem, such as oversight, may occur. Items for the determination of the printing quality include an item that is a color difference or the like and is hardly determined by visual inspection. Therefore, it is desirable that a printing abnormality detection system that is achieved by a machine be used with visual inspection. For example, JP-A-2008-160284 discloses a method for reading an image of a single printed matter or images of a plurality of printed matters for each printing operation and executing printing on an abnormal printed matter again while comparing the image or the images with the original image data.

However, printing may be executed for a long and large job, depending on the field of printing. For example, in the field of textile printing or the like, a print job for printing of a matter with a length of several meters may be executed. Therefore, a method for efficiently detecting and handling a printing failure is desired.

SUMMARY

According to an aspect of the present disclosure, a printing abnormality detection system includes a printer that prints an image on a printing medium based on image data, a reader that reads the image printed on the printing medium, a processing unit that detects an abnormal printed portion based on read image data from the reader, a storage unit that stores information of a display necessity determination criterion, and a display unit. The processing unit determines, based on the image data, the read image data, and the display necessity determination criterion, whether the abnormal printed portion is to be displayed on the display unit. When the processing unit determines that the abnormal printed portion is to be displayed, the processing unit executes a process of displaying, on the display unit, abnormal printed portion information including an image of the abnormal printed portion.

According to another aspect of the present disclosure, a printing abnormality detection method includes printing an image on a printing medium based on image data, reading the image printed on the printing medium to acquire read image data, detecting an abnormal printed portion based on the read image data, determining, based on the image data, the read image data, and a display necessity determination criterion, whether the abnormal printed portion is to be displayed on a display unit, and displaying, on the display unit, abnormal printed portion information including an image of the abnormal printed portion when it is determined that the abnormal printed portion is to be displayed.

BRIEF DESCRIPTION OF THE DRAWINGS

FIG. 16 is a diagram illustrating an example of a detailed configuration of display necessity determination criteria.

DESCRIPTION OF EXEMPLARY EMBODIMENTS

Hereinafter, an embodiment is described. The embodiment described below does not unduly limit details described in the appended claims. Furthermore, not all configurations described in the embodiment are necessarily essential.

1. Method According to Embodiment

Figure 1:
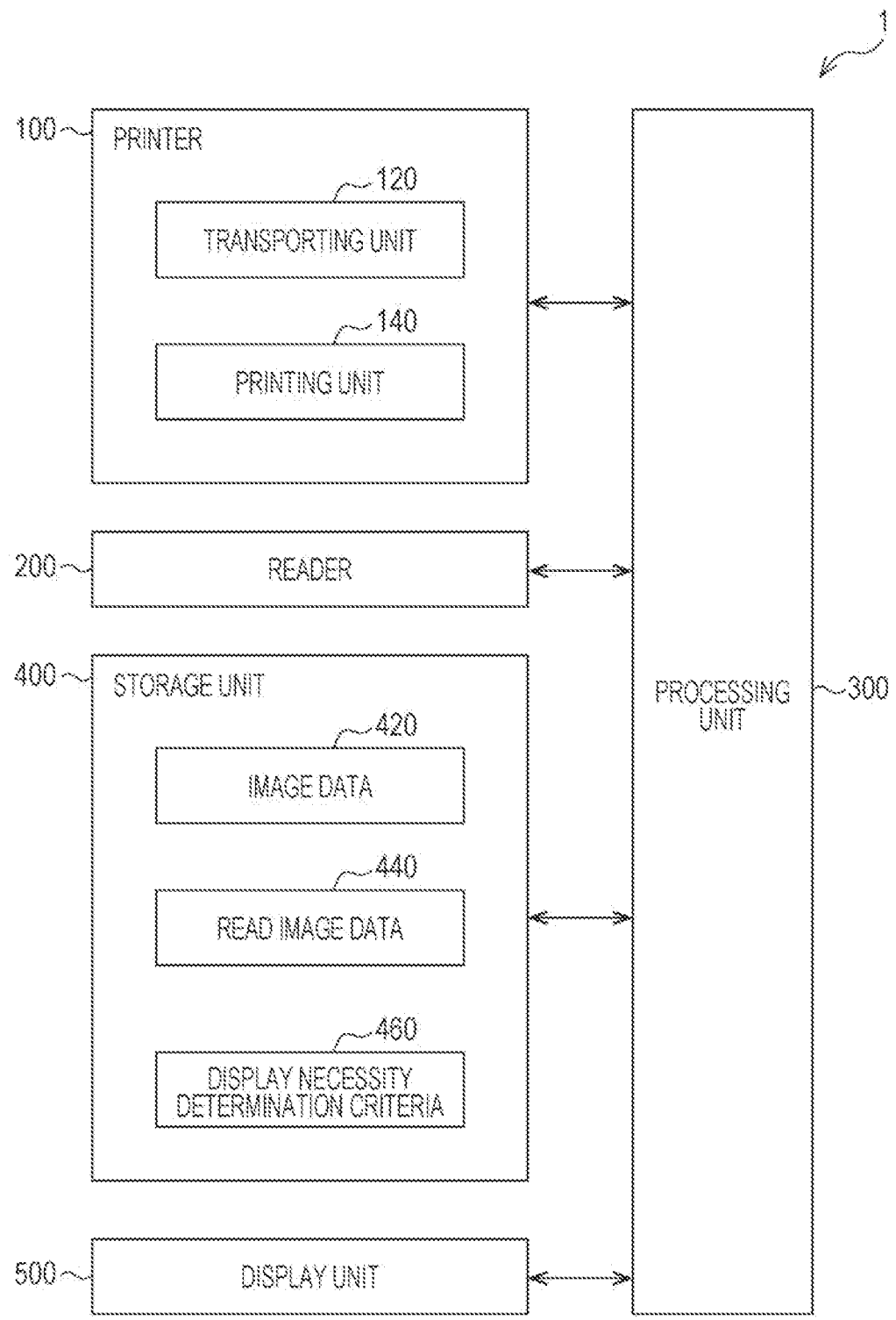
FIG. 1 is a block diagram illustrating an example of a configuration of a printing abnormality detection system.
Figure 2:
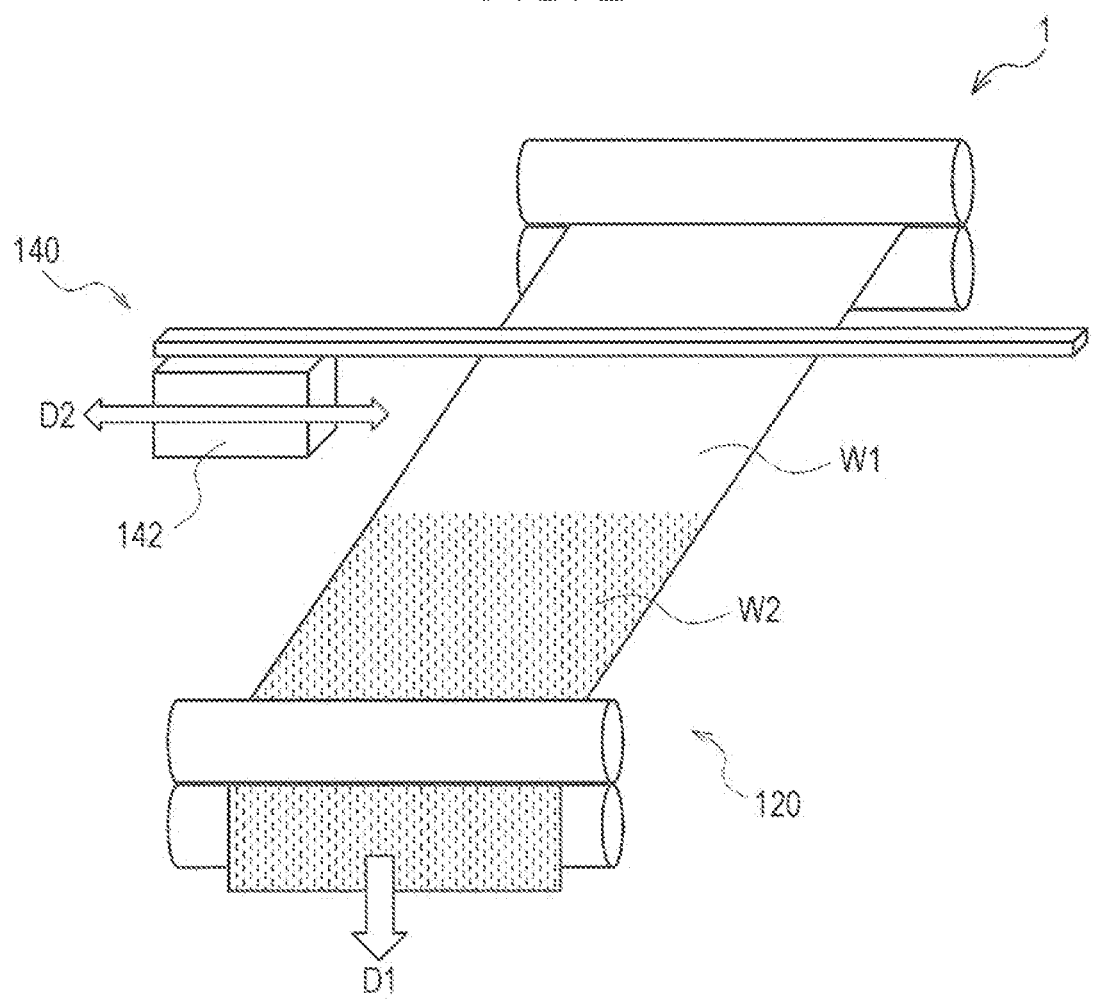
FIG. 2 is a schematic explanatory diagram of the printing abnormality detection system.

FIG. 1 is a block diagram of a printing abnormality detection system 1 according to the embodiment. FIG. 2 is a schematic explanatory diagram of the printing abnormality detection system 1. As illustrated in FIG. 1, the printing abnormality detection system 1 includes a printer 100, a reader 200, a processing unit 300, a storage unit 400, and a display unit 500. The printing abnormality detection system 1 may be referred to as printing system. In the following description, the printing abnormality detection system 1 is merely referred to as system in some cases.

The printer 100 prints an image on a printing medium W. The image is based on image data 420 stored in the storage unit 400. The printer 100 includes a transporting unit 120 and a printing unit 140. When the printer 100 is used for textile printing, the printing medium W is, for example, cloth made of natural fiber or of synthetic fiber. However, the printing medium W may be another medium of paper or the like, depending on the use of the printer 100. The following describes a case in which the printing medium before printing is indicated by a reference sign W1 and in which the printing medium after the printing is indicated by a reference sign W2 and a case in which the printing medium is merely indicated by the reference sign W.

Figure 7:
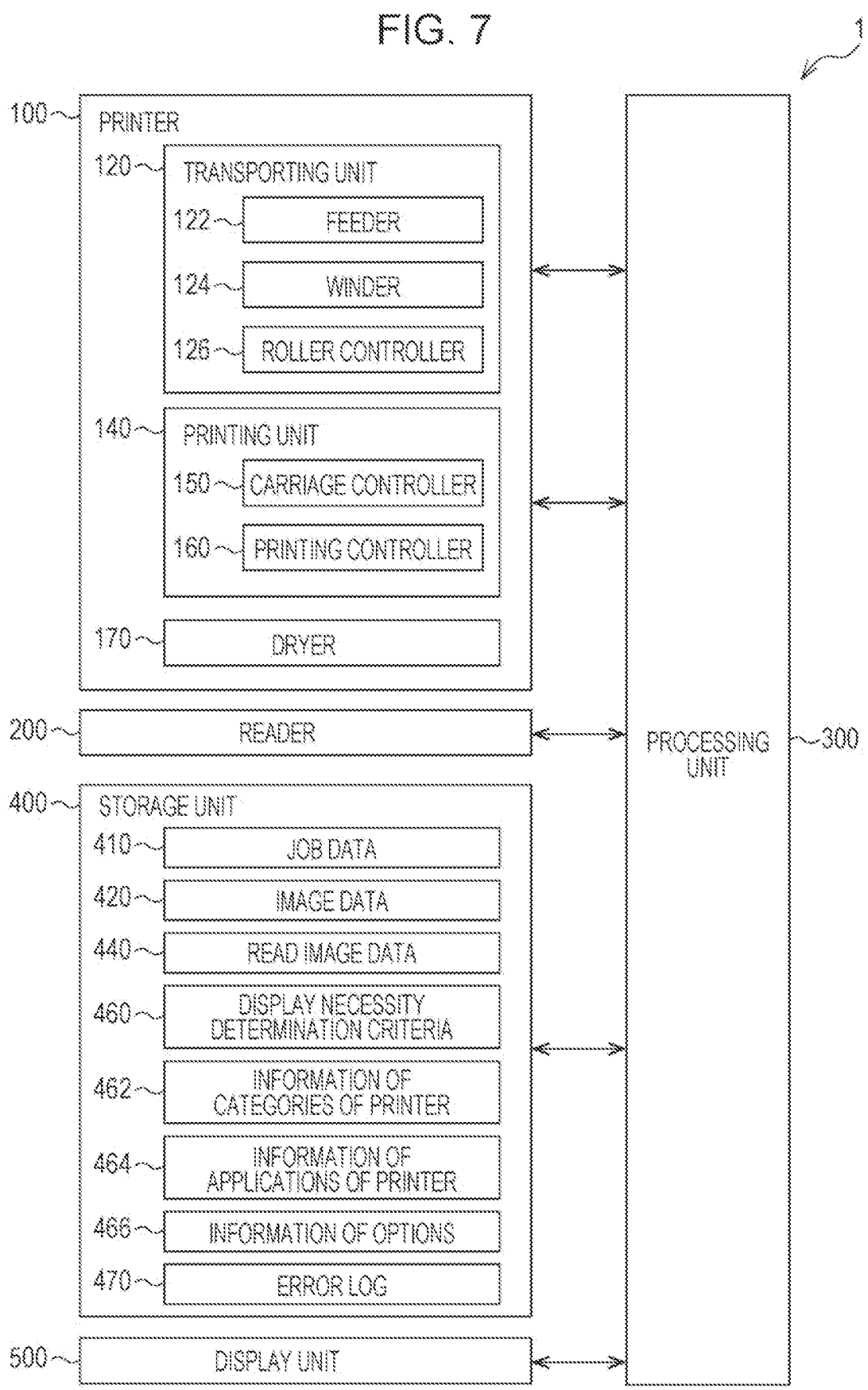
FIG. 7 is a block diagram illustrating an example of a detailed configuration of the printing abnormality detection system.
Figure 8:
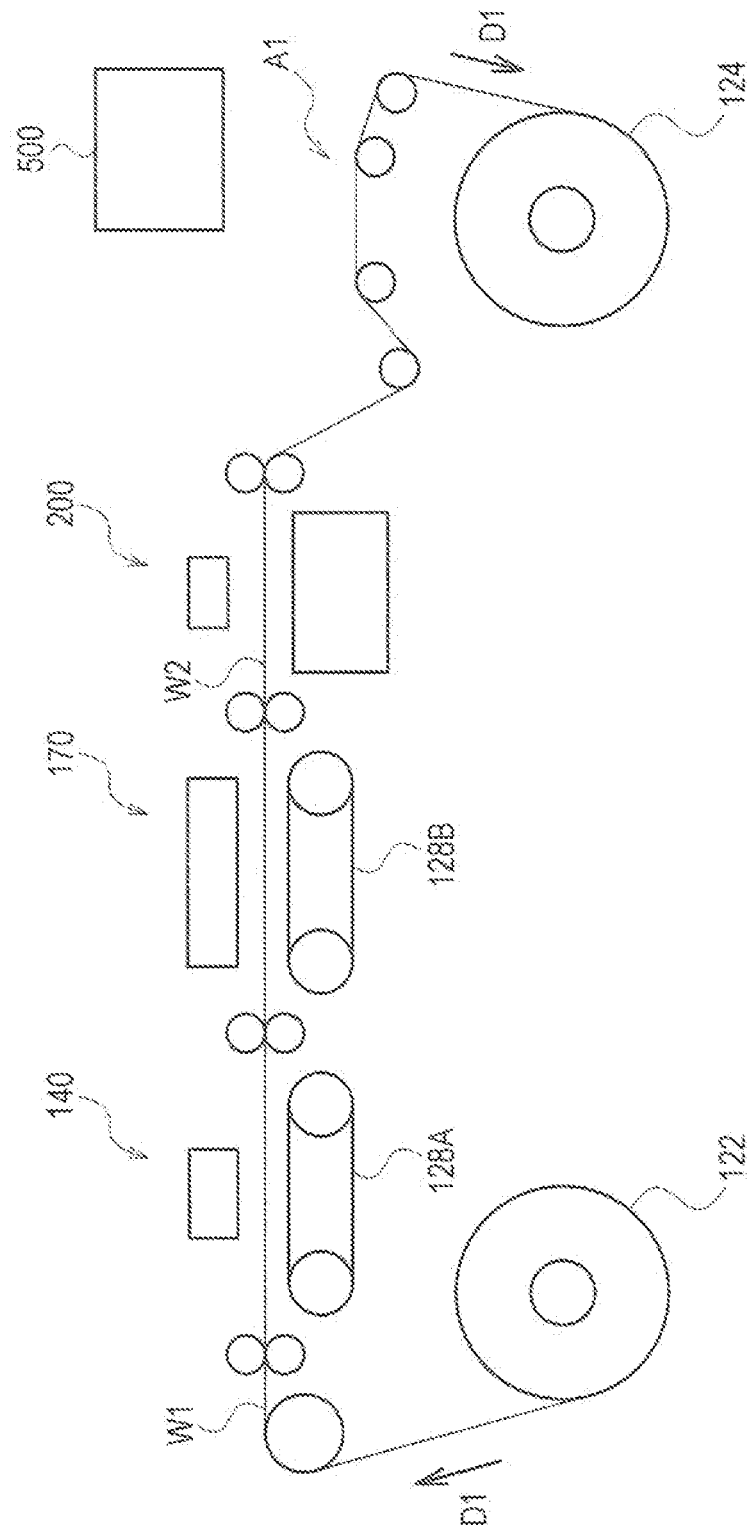
FIG. 8 is a schematic explanatory diagram of a mechanical mechanism of the printing abnormality detection system.

The transporting unit 120 transports the printing medium W toward a predetermined direction. The transporting unit 120 includes a feeder 122, a winder 124, and a roller controller 126, as described later with reference to FIGS. 7 and 8. Therefore, even when the printing medium W is used for textile printing or the like and is long, the printer 100 can execute printing on the printing medium W. The predetermined direction is, for example, a direction D1 from the feeder 122 to the winder 124 or the like, as illustrated in FIG. 8. The feeder 122, the winder 124, and the roller controller 126 are described later.

For example, when the printer 100 is used for textile printing, the printing unit 140 includes a carriage 142 that uses a predetermined guide to reciprocate in a direction D2, as illustrated in FIG. 2. The direction D2 is perpendicular to the foregoing transport direction D1. The carriage 142 includes, for example, a print head and an ink cartridge. The predetermined guide extends in the direction D2. Therefore, the printer 100 can print a print image on the printing medium W by a combination of an operation of the transporting unit 120 and an operation of the printing unit 140. The print image is formed, for example, based on the image data 420 stored in the storage unit 400.

The reader 200 reads the image printed on the printing medium W. The reader 200 can be achieved by a scanner, but may be achieved by a camera, a colorimeter, or the like or by a combination thereof. The colorimeter is described later. The reader 200 is achieved by being fixed and installed at a predetermined position. However, the reader 200 may be achieved in such a manner that the reader 200 can move along the predetermined guide in the same manner as the printing unit 140. Details of the reader 200 are described later. The reader 200 reads the image printed on the printing medium W in accordance with an instruction from the processing unit 300 (described later) at predetermined time and sequentially transmits read image data 440 acquired by reading the image by the reader 200 to the processing unit 300 and the storage unit 400.

The processing unit 300 controls each of the printer 100, the reader 200, the storage unit 400, and the display unit 500. The processing unit 300 detects an abnormal printed portion EA based on the read image data 440 from the reader 200, but a detailed process of the detection is described later. The processing unit 300 according to the embodiment is composed of the following hardware. The hardware may include either one or both of a circuit that processes a digital signal and a circuit that processes an analog signal. For example, the hardware may be composed of one or multiple circuit devices implemented on a circuit substrate or may be composed of one or multiple circuit elements implemented on a circuit substrate. The circuit devices are, for example, integrated circuit devices. The circuit elements are, for example, resisters, capacitors, or the like.

The processing unit 300 can be achieved by the following processor. The processing unit 300 according to the embodiment includes a memory that stores information, and the processor that operates based on the information stored in the memory. The information is, for example, a program, various data, and the like. The processor includes hardware. As the processor, one or more of various processors, such as a central processing unit (CPU), a graphics processing unit (GPU), and a digital signal processor (DSP), may be used. The memory may be a semiconductor memory, such as a static random-access memory (SRAM) or a dynamic random-access memory (DRAM), or may be a register, a magnetic storage device, such as a hard disk device, or an optical storage device, such as an optical disc device. The memory stores, for example, a computer-readable instruction. The processor executes the instruction to achieve functions of the processing unit 300 as processes. The instruction may be a set of instructions forming a program or may be an instruction to cause the hardware circuits of the processor to operate. The entire processing unit 300 or a portion of the processing unit 300 may be achieved by cloud computing.

The storage unit 400 can temporarily store a program to be executed by the processing unit 300, calculation details relating to an operation of the processing unit 300, data on the printing abnormality detection system 1, and the like. The data on the printing abnormality detection system 1 includes, for example, the foregoing image data 420, the read image data 440, and display necessity determination criteria 460. The storage unit 400 can be achieved by a register, a semiconductor, a magnetic storage device, an optical storage device, or the like. The semiconductor memory is, for example, a DRAM, an SRAM, or the like. The magnetic storage device is, for example, an HDD. The optical storage device is, for example, a CD-ROM, a DVD-ROM, or the like. The storage unit 400 includes a storage region that stores a program to be executed by the processor and data to be processed by the processor. For example, the storage unit 400 stores a control program to be executed by the processor and setting data including various setting values relating to an operation of the processing unit 300. The storage unit 400 includes a nonvolatile storage region that stores a program and data in a nonvolatile manner.

The display unit 500 displays an image relating to a printing state and printing abnormality detection in accordance with a process by the processing unit 300. The display unit 500 can be achieved by, for example, a liquid crystal display. However, the display unit 500 may be achieved by an organic electroluminescence (EL) display or the like. The display unit 500 may include hardware, such as a touch panel, and function as an operating unit. For example, the display unit 500 displays an image 520 of print job information, an image 540 of reading information, and the like, as illustrated in FIG. 3.

Figure 3:
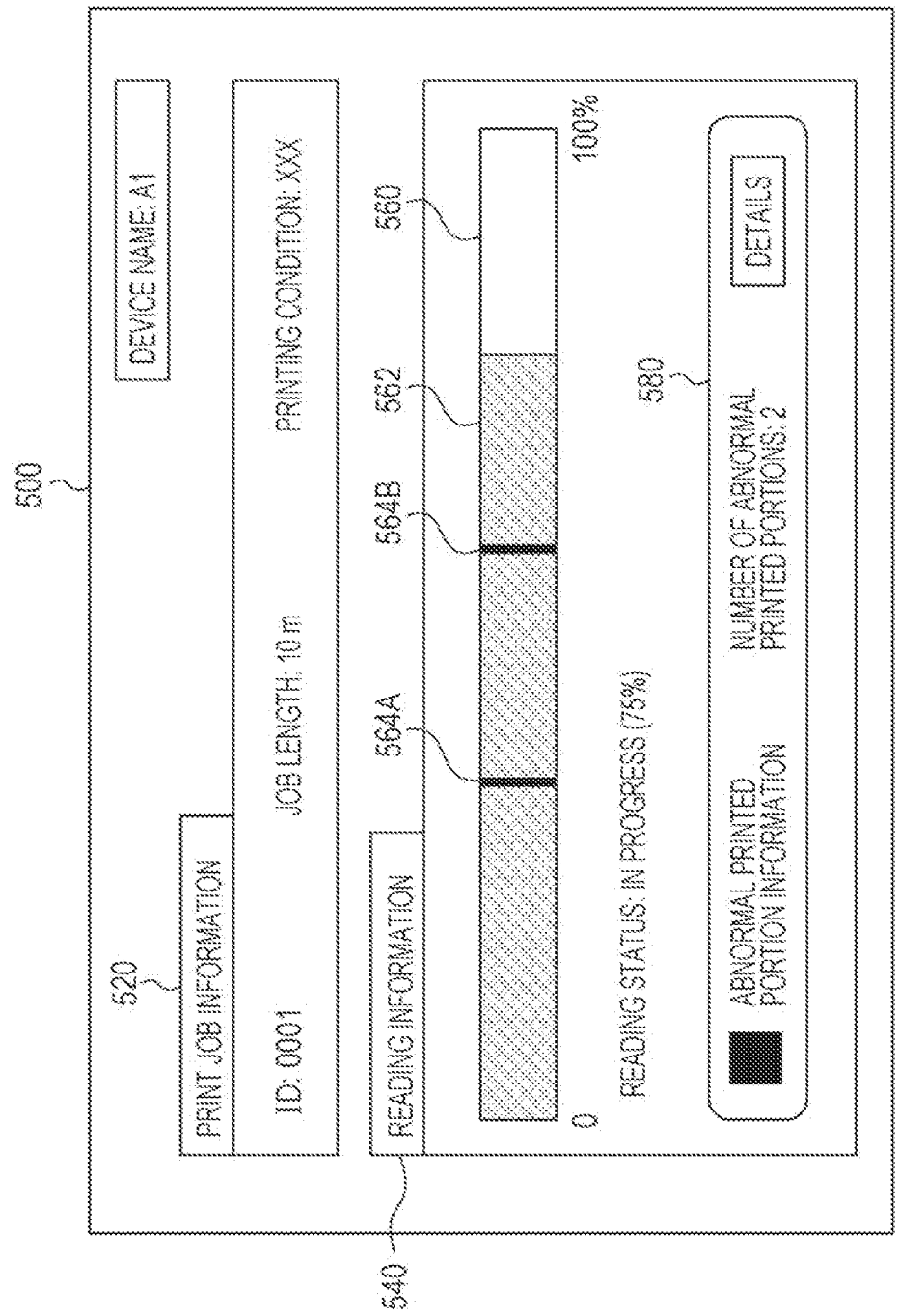
FIG. 3 is an explanatory diagram of an image of print job information and an image of reading information.

The image 520 of the print job information illustrated in FIG. 3 is a displayed image indicating information on a print job. For example, the image 520 may include an image indicating an ID identifying a detail of the job, the length of the job, a printing condition, and the like. However, the image 520 may include an image relating to another item.

The image 540 of the reading information includes, for example, a status bar image 560 and abnormal printed portion information 580. The status bar image 560 includes, for example, a progress bar image 562 and abnormal portion identification images 564A and 564B, as illustrated in FIG.

3. In the following description, the abnormal portion identification images are indicated by a reference numeral 564 in some cases. Therefore, the progress of reading and the presence of an abnormal printed portion can be intuitively recognized during the execution of the entire job. Displayed details of the image 540 of the reading information can be variously modified. For example, the progress of the reading may not be displayed in the progress bar image and may be displayed in a graph image.

Figure 4:
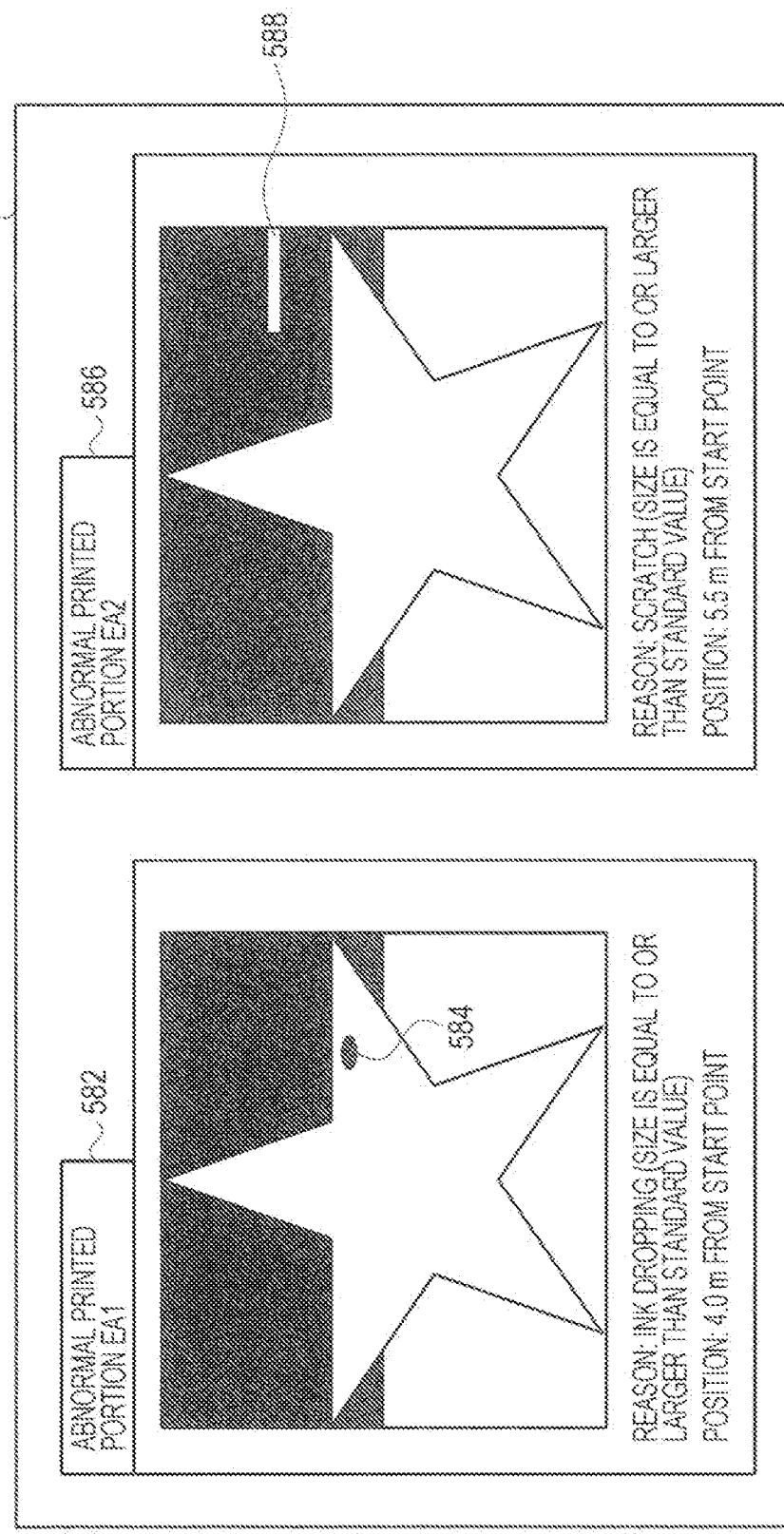
FIG. 4 is an explanatory diagram of abnormal printed portions.

The abnormal printed portion information 580 is information on a portion determined to have a printing abnormality in a process by the processing unit 300 (described later). For example, as illustrated in FIG. 3, the abnormal printed portion information 580 is achieved by displaying an image. The abnormal printed portion information 580 includes an image of the abnormal printed portion EA. Specifically, for example, as illustrated in FIG. 4, the abnormal printed portion information 580 can be achieved by displaying an image 582 of an abnormal printed portion EA1 and an image 586 of an abnormal printed portion EA2. The image 582 of the abnormal printed portion EA1 corresponds to the abnormal portion identification image 564A illustrated in FIG. 3. The image 586 of the abnormal printed portion EA2 corresponds to the abnormal portion identification image 564B illustrated in FIG. 3. In the following description, the image 582 of the abnormal printed portion EA1 and the image 586 of the abnormal printed portion EA2 are distinguished from each other in some cases, referred to as images 582 and 586 indicating the abnormal printed portions EA in some cases, and merely referred to as images of the abnormal printed portions EA in some cases.

The images of the abnormal printed portions EA are displayed in such a manner that the images of the abnormal printed portions EA include information of reasons that the portions have been determined to be abnormal, and positional information of the abnormal portions, as illustrated in FIG. 4, but other information may be displayed. In an example illustrated in FIG. 4, the image 582 of the abnormal printed portion EA1 is displayed and indicates that an abnormal portion image 584 caused by ink dropping has been detected, and the image 586 of the abnormal printed portion EA2 is displayed and indicates that an abnormal portion image 588 caused by a scratch has been detected. A method for displaying the images of the abnormal printed portions EA is not limited to the method illustrated in FIG. 4 and may be variously modified. For example, the image 582 of the abnormal printed portion EA1 illustrated in FIG. 4 and the image 586 of the abnormal printed portion EA2 illustrated in FIG. 4 may be displayed together with the image 540 of the reading information illustrated in FIG. 3.

Figure 5:
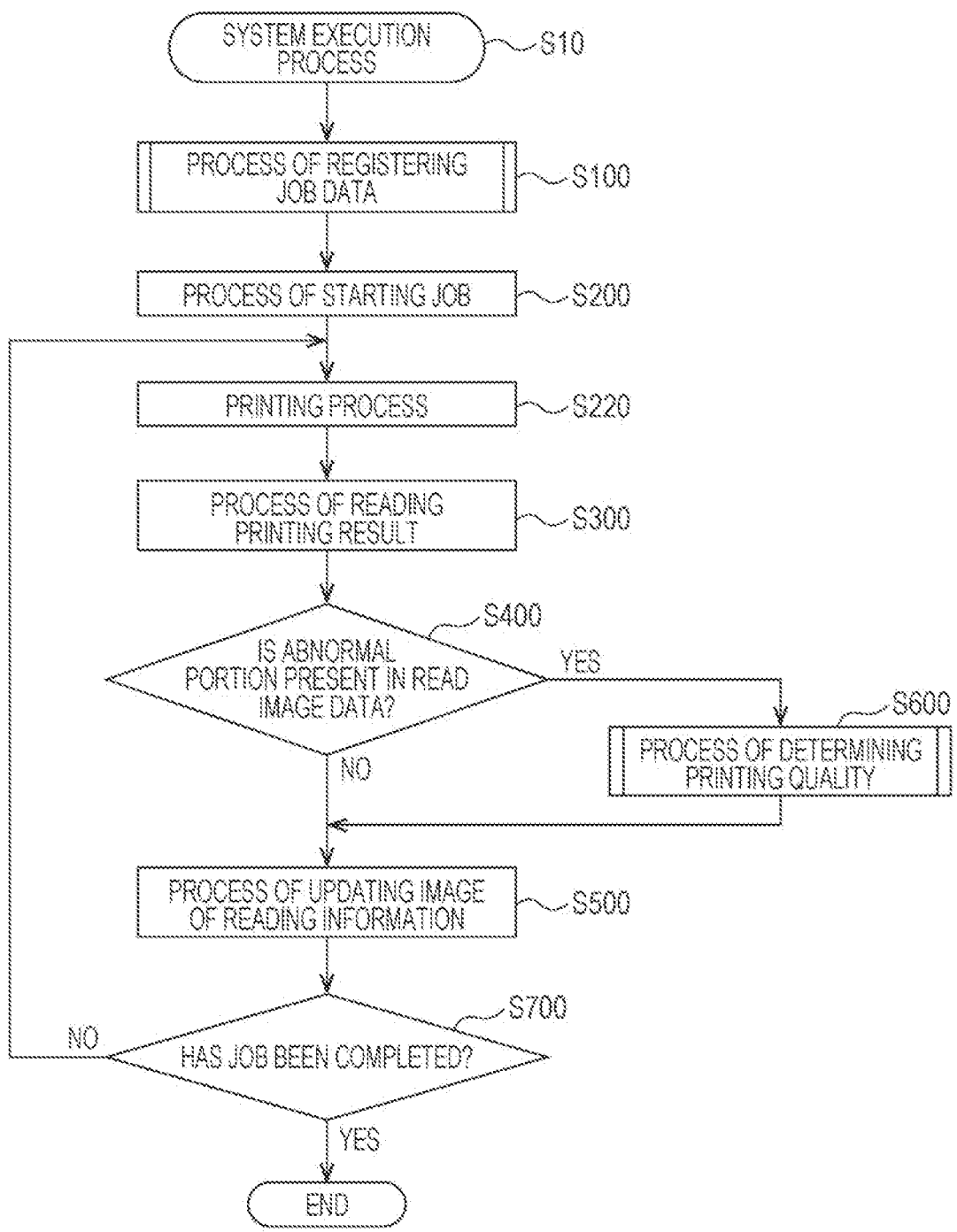
FIG. 5 is a flowchart illustrating an example of a system execution process.

Next, a system execution process (step S10) to be executed by the processing unit 300 to display the abnormal printed portion information 580 and the like on the display unit 500 is described. FIG. 5 is a flowchart illustrating an example of the system execution process (step S10). The system execution process (step S10) constitutes a part of printing quality inspection (described later).

The processing unit 300 first executes a process (step S100) of registering job data in the system execution process. The process of registering job data is a process of determining a detail of a job. The detail of the job includes a display necessity determination criterion 460 (described later). The detail of the job is described later in detail. After that, the processing unit 300 executes a process (step S200) of starting the job, thereby starting an operation of the printer 100. After that, the processing unit 300 executes a printing process (step S220), thereby causing the transporting unit 120 to transport the printing medium W and causing the printing unit 140 to execute printing.

After that, the processing unit 300 executes a process (step S300) of reading a printing result. By executing the process of reading a printing result, the transporting and the printing are executed, the printed printing medium W2 is read by the reader 200, and the read image data 440 is transmitted to the processing unit 300. Then, the processing unit 300 compares the image data 420 with the transmitted read image data 440. When the processing unit 300 determines that an abnormal portion is not present in the read image data 440 (NO in step S400), the processing unit 300 executes a process (step S500) of updating the image of the reading information without executing a process (step S600 described later in detail) of determining a printing quality. Specifically, the processing unit 300 executes a process of controlling the display unit 500 to update the progress bar image 562 illustrated in FIG. 3 and the like.

Then, the processing unit 300 determines whether the job is already completed. When the job is not completed (NO in step S700), the processing unit 300 continuously executes the printing process (step S220). Specifically, the processes of S300 to S600 that relate to the reading of a printing result are executed in real time within a time period for which the transporting unit 120 and the printing unit 140 operate. On the other hand, when the processing unit 300 determines that an abnormal portion is present in the transmitted read image data 440 (YES in step S400), the processing unit 300 executes the process (step S600) of determining a printing quality.

Figure 6:
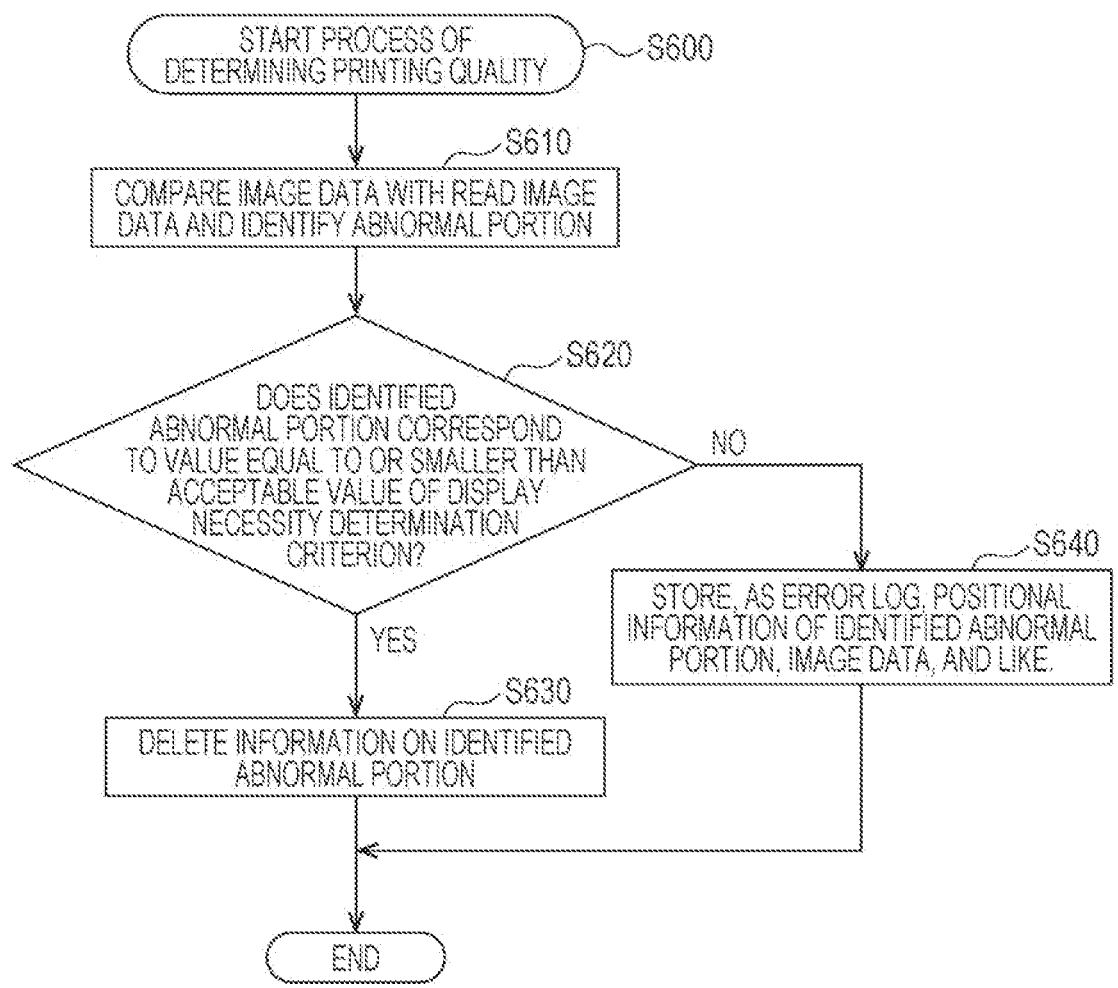
FIG. 6 is a flowchart illustrating an example of a process of determining a printing quality.

The process (step S600) of determining a printing quality is described below. FIG. 6 is a flowchart illustrating an example of details of the process of determining a printing quality. The processing unit 300 compares the image data 420 with the read image data 440 and identifies an abnormal portion (step S610). The abnormal portion is, for example, a portion of the abnormal portion image 584 illustrated in FIG. 4 described above, a portion of the abnormal portion image 588 illustrated in FIG. 4 described above, or the like. For example, the abnormal portion can be identified by pattern matching of the image data 420 with the read image data 440 or the like. When an image of the abnormal portion is close to a circle, the abnormal portion may be classified into ink dropping. When the image of the abnormal portion is close to a line, the abnormal portion may be classified into a scratch.

Next, the processing unit 300 determines whether the abnormal portion corresponds to a value equal to or smaller than an acceptable value of the display necessity determination criterion 460 (step S620). The acceptable value is also referred to as standard value. The display necessity determination criterion 460 is a criterion for determining whether a user needs to perform checking by visual inspection. The display necessity determination criterion 460 includes the predetermined acceptable value and is described later in detail. An abnormality that corresponds to a value equal to or smaller than the acceptable value of the display necessity determination criterion 460 has a very small effect on the printing quality of the printing medium W2 and can be determined to be a non-defective portion that does not need to be visually inspected by the user.

When the abnormal portion corresponds to a value equal to or smaller than the acceptable value of the display necessity determination criterion 460 (YES in step S620), the processing unit 300 executes a process (step S630) of deleting information on the abnormal portion. The information on the abnormal portion is, for example, an abnormal image relating to the abnormal portion, positional information of the abnormal portion, and the like. Thus, the information on the abnormal portion does not remain as an error log 470 (illustrated in FIG. 7 and described later) in the storage unit 400, for example. Therefore, it is possible to secure a sufficient storage region of the storage unit 400.

On the other hand, when the abnormal portion corresponds to a value exceeding the acceptable value of the display necessity determination criterion 460 (NO in step S620), the positional information on the abnormal portion, the image data, and the like are stored (step S640). Specifically, for example, the information on the abnormal portion is stored as the error log 470 (illustrated in FIG. 7) in the storage unit 400.

The process returns to the flowchart of FIG. 5 and the process (step S500) of updating the image of the reading information is executed. Specifically, for example, in FIG. 3, a process of updating the progress bar image 562 and an update process of newly adding the abnormal portion identification images 564 are executed. Furthermore, a process of updating the number of abnormal printed portions in the abnormal printed portion information 580 illustrated in FIG. 3 and an update process of adding the images of the abnormal printed portions EA illustrated in FIG. 4 are executed.

As described above, the printing abnormality detection system 1 according to the embodiment includes the printer 100 that prints an image on a printing medium based on image data, the reader 200 that reads the image printed on the printing medium, and the processing unit 300 that detects an abnormal printed portion EA based on read image data from the reader 200. Thus, it is possible to find a portion in which a printing abnormality has occurred. Therefore, a product can be repaired or the like before shipment, and it is possible to prevent a product that has a printing failure from being distributed. The printing abnormality detection system 1 also includes the storage unit 400 that stores information of the display necessity determination criteria 460. Therefore, the printing abnormality detection system 1 does not detect a minor printing abnormality that does not need to be displayed and thus it is possible to efficiently perform a task of checking a printing abnormality. The printing abnormality detection system 1 also includes the display unit 500, and thus it is possible to intuitively and clearly recognize information on printing abnormality detection. The information on the printing abnormality detection is positional information of the abnormal printed portions EA, image information of the abnormal printed portions EA, information of a reason that the portions EA are determined to be abnormal, and the like. The processing unit 300 determines, based on the image data 420, the read image data 440, and the display necessity determination criteria 460, whether the abnormal printed portions EA are to be displayed on the display unit 500. When the processing unit 300 determines that the abnormal printed portions EA are to be displayed, the processing unit 300 executes a process of displaying, on the display unit 500, the abnormal printed portion information 580 including the images 582 and 586 of the abnormal printed portions. Therefore, the user can check the positions of the abnormal printed portions EA and the images of the abnormal printed portions EA. Even when a long job for textile printing is executed, an abnormal printed portion can be easily identified. Specifically, when printing is executed for a long and large job, it is possible to provide the printing abnormality detection system 1 and the like that can efficiently detect and handle a printing failure. Since a portion that needs to be visually inspected by the user is minimized based on the display necessity determination criteria 460 and displayed on the display unit 500, it is possible to reduce burden of the visual inspection by the user.

When a print job is long, an abnormality in a printing quality needs to be quickly determined in order to execute printing while sequentially comparing image data read from a printed matter with original image data, as described in JP-A-2008-160284. When an abnormality in a printing quality is quickly determined, a problem may occur, which is a discrepancy that the printing quality of a printing result determined to be abnormal is determined to be acceptable by actual visual inspection. According to the foregoing printing abnormality detection system 1 according to the embodiment, after it is determined whether the discrepancy may occur based on the display necessity determination criteria 460, the abnormal printed portion information 580 is displayed on the display unit 500. Therefore, it is possible to update the display necessity determination criteria 460 to appropriate acceptable values at any time.

2. Example of Configuration and Example of Process When Category of Printer is Textile Printing The printing abnormality detection system 1 according to the embodiment is not limited to the foregoing system and may be variously modified by adding another function based on a category of the printer or the like. An example of a detailed configuration when the category of the printer 100 is textile printing is described below. FIG. 7 is a block diagram illustrating the example of the detailed configuration of the printing abnormality detection system 1. FIG. 8 is a diagram schematically illustrating a mechanical mechanism of the printing abnormality detection system 1. The same configurations as those described above will not be described.

As illustrated in FIG. 8, the printing medium W1 before printing is formed in a long shape, wound in a roll shape, and fed from the feeder 122. After that, while the printing medium W1 is transported by a transport roller 128A, the printing unit 140 prints an image on the printing medium W1. While the printing medium W2 after the printing is transported by a transport roller 128B, a dryer 170 dries ink of the printed image. After that, the printing medium W2 is transported by the transporting unit 120 along a transport path (not illustrated) of the transporting unit 120 in such a manner that the printing medium W2 passes through a region in which the reader 200 is present. The printed image is read by the reader 200. After that, the printing medium W2 is wound by the winder 124.

As illustrated in FIG. 8, a predetermined position A1 may be set upstream with respect to a position where the printing medium W2 is wound by the winder 124. For example, the predetermined position A1 is used when the user performs visual inspection. The display unit 500 may be installed at a position close to the predetermined position A1. Therefore, it is possible to easily compare a result of the visual inspection by the user with an image displayed on the display unit 500 in quality checking and inspection (described later). Although not illustrated, an input and output unit may be installed near the predetermined position A1. The input and output unit is, for example, an interface to be used by the user to input acceptable values of the display necessity determination criteria 460 or the like. Alternatively, the input and output unit is, for example, an interface for inputting data to the printing abnormality detection system 1 from a predetermined external device and outputting data from the printing abnormality detection system 1 to the predetermined external device, or the like. The predetermined external device is, for example, a storage medium, a server, or the like. Therefore, it is possible to easily update the display necessity determination criteria 460 (described later).

The feeder 122 is a mechanism that feeds the printing medium W1 that has been formed in a long shape and is the printing medium W wounded in a roll shape before the printing. The winder 124 is a mechanism that winds the printing medium W2 that is the printing medium W after the printing. The feeder 122 and the winder 124 are achieved by driving of a motor (not illustrated) or the like. The feeder 122 is positioned most upstream on the transport path for the printing medium W, while the winder 124 is positioned most downstream on the transport path for the printing medium W. The roller controller 126 controls rollers that are used to transport the printing medium W from the feeder 122 to the winder 124. The rollers include, for example, the pair of transport rollers 128A and 128B that drive an endless transport belt, as illustrated in FIG. 8. However, the rollers may include a tension roller (not illustrated).

The printing unit 140 includes a carriage controller 150 and a printing controller 160, as illustrated in FIG. 7. The carriage controller 150 controls a driving mechanism (not illustrated) of the carriage 142 and causes the carriage 142 to reciprocate in the direction D2 at an appropriate speed. The printing controller 160 controls an ejection state of a print head (not illustrated), an amount of remaining ink, and the like. When the ejection state or the amount of remaining ink is abnormal, the printing controller 160 outputs a signal indicating the abnormality to the processing unit 300, and the printer 100 issues an alarm or the like.

The dryer 170 dries ink or the like on the printing medium W2 printed by the printing unit 140. Specifically, the drying can be achieved by a known technique, such as a mechanism that blows warm air or the like. Instead of the dryer 170, an ultraviolet radiator or the like may be used. Alternatively, as the dryer 170, a combination of the known technique and the ultraviolet radiator may be used.

Figure 9:
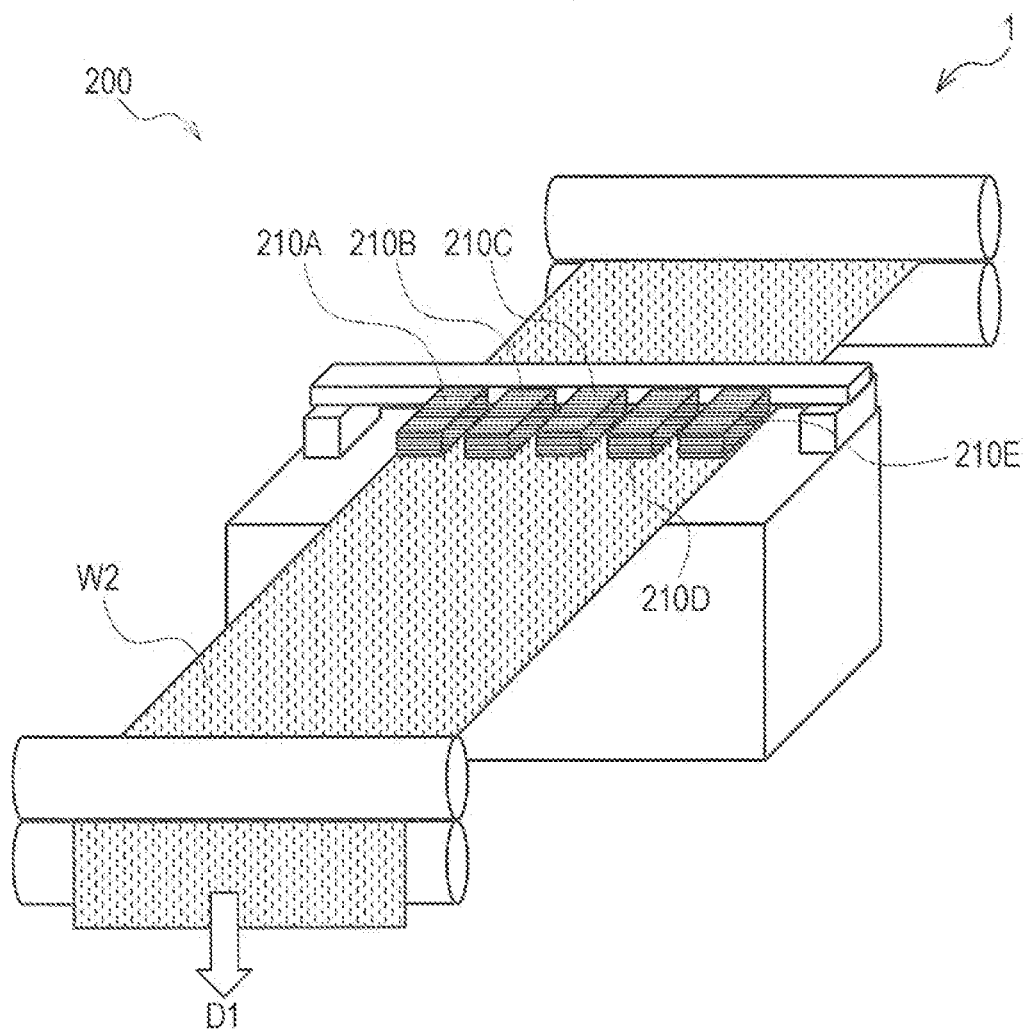
FIG. 9 is a schematic explanatory diagram of an example of a configuration of a reader.

The reader 200 reads an image printed on the printing medium W2 with ink dried by the dryer 170. For example, as illustrated in FIG. 9, the reader 200 can be achieved by attaching reading devices 210A to 210E to a predetermined guide unit in such a manner that the reading devices 210A to 210E are arranged side by side. The reading devices 210A to 210E are reading devices 210. The number of reading devices 210 is not limited to 5 as illustrated in FIG. 9. Each of the reading devices 210 can be achieved by a scanner, a camera, a colorimeter, a combination thereof, or the like.

Figure 10:
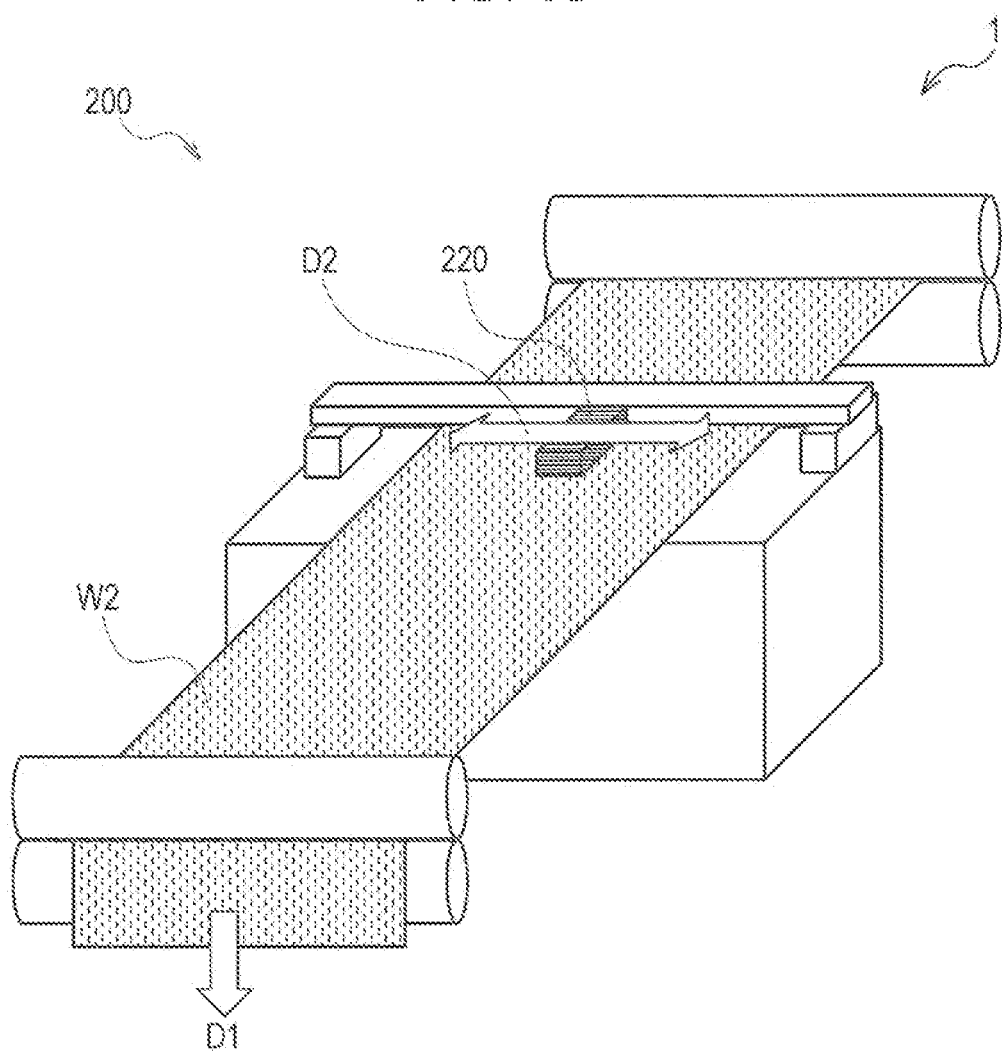
FIG. 10 is a schematic explanatory diagram of another example of the configuration of the reader.

For example, as illustrated in FIG. 10, the reader 200 may be achieved by causing a reading device 220 to reciprocate along the predetermined guide unit in the foregoing direction D2 by a driving mechanism (not illustrated). In this case, it is possible to reduce the number of reading devices 220. The reading device 220 can be achieved by a scanner, a camera, a colorimeter, a combination thereof, or the like.

Figure 11:
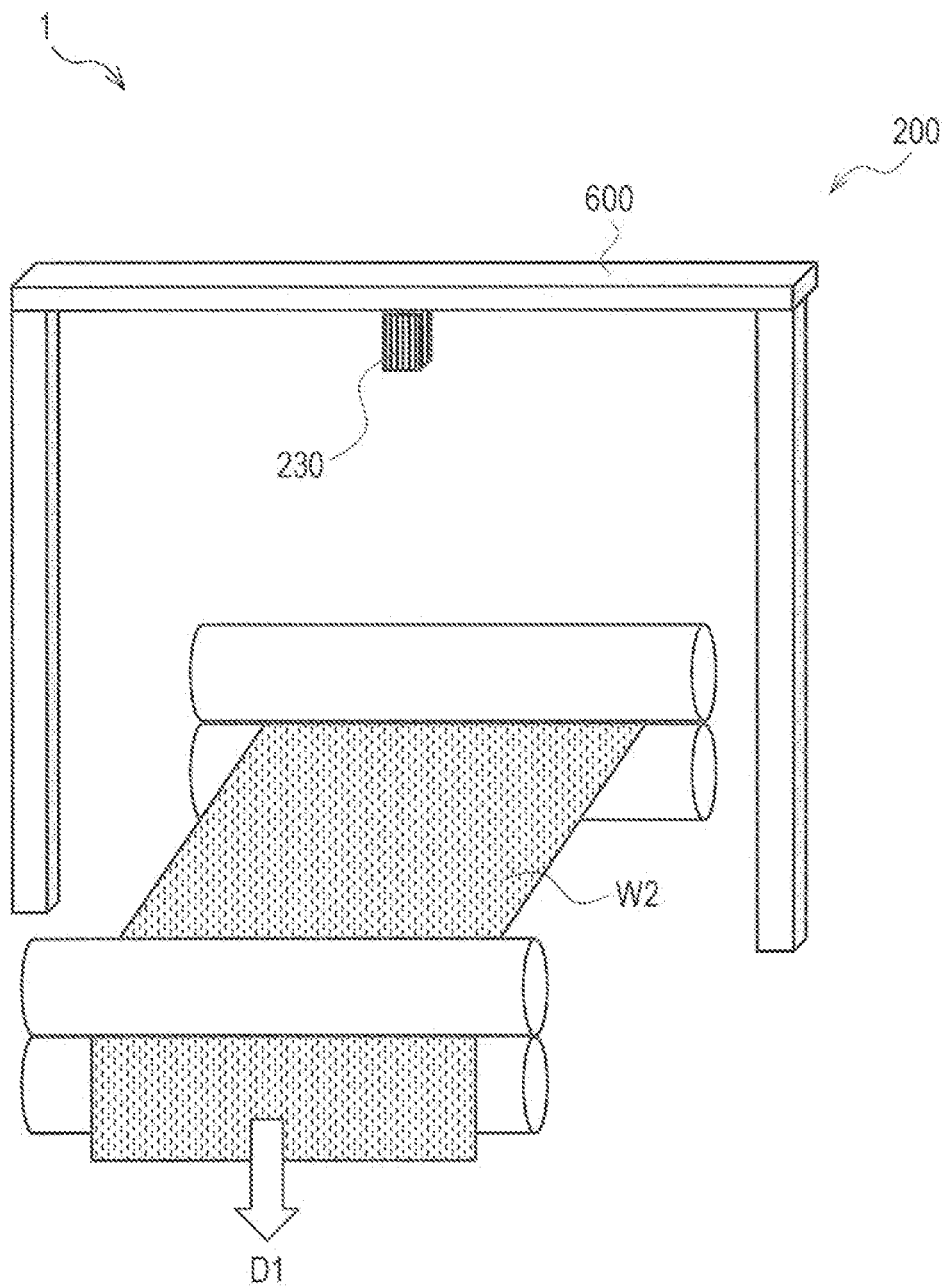
FIG. 11 is a schematic explanatory diagram of still another example of the configuration of the reader.

The reader 200 may be achieved by installing a reading device 230 in a housing 600 in such a manner that the reading device 230 reads an image or the like from a high position, as illustrated in FIG. 11. In this case, it is possible to reduce a region in which the reader 200 is installed. The reading device 230 can be achieved by a wide-angle camera.

As illustrated in FIG. 7, the storage unit 400 stores the control program (not illustrated), job data 410, the image data 420, the read image data 440, the display necessity determination criteria 460, information 462 of categories of the printer, information 464 of applications of the printer, an error log 470, and the like. The storage unit 400 may store information 466 of options when necessary.

The job data 410 includes data of a product name, a lot number, a job length, a printing condition, and the like that can be identified by IDs or the like. The image data 420, the read image data 440, the display necessity determination criteria 460, the information 462 of the categories of the printer, the information 464 of the applications of the printer, and the like are associated with the IDs and can be referenced and changed by selecting the registered IDs. A detailed method for referencing and changing the display necessity determination criteria 460 is described with reference to a flowchart of FIG. 12 (described later).

The information 462 of the categories of the printer is associated with the display necessity determination criteria 460. Specifically, the storage unit 400 stores information of the display necessity determination criteria 460 including determination criteria different for the categories of the printer. For example, the storage unit 400 stores, in a table data format (illustrated in FIG. 16 described later), the display necessity determination criteria 460 for the information 462 of the respective categories of the printer. FIG. 16 illustrates an example of display necessity determination criteria 460 in the case where the information 462 of the category of the printer indicates textile printing. However, the storage unit 400 stores the display necessity determination criteria for the other categories of the printer in the same manner. The other categories of the printer are, for example, signage, sublimation transfer, labeling, and the like. A selection screen 592 (illustrated in FIGS. 13 to 15 described later) for the category of the printer is displayed based on the information 462 of the category of the printer. When the display necessity determination criteria 460 differ for the respective categories of printer 100, the printing abnormality detection system 1 can be used for different types of printers 100. Even when the category of the printer 100 is changed, the printing abnormality detection system 1 can be continuously used.

The information 464 of the applications of the printer is associated with the information 462 of the respective categories of the printer and is stored in the storage unit 400. In other words, the storage unit 400 stores the information of the display necessity determination criteria 460 including determination criteria different for the applications of the printer 100. For example, as illustrated in FIG. 16, when the category of the printer is textile printing, luxury clothes, normal clothes, and cloth are stored in the storage unit 400 as the information 464 of the applications of the printer. The display necessity determination criteria 460 are stored in the storage unit 400 in such a manner that the display necessity determination criteria 460 differ for the respective applications of the printer. Thus, the display necessity determination criteria 460 can be variously set for the respective applications of the printer 100. Therefore, the user can easily manage the display necessity determination criteria 460.

When the information 462 of the category of the printer indicates signage, an example of information 464 of an application of the printer is a drop curtain, a poster, or the like. When the information 462 of the category of the printer indicates sublimation transfer, an example of the information 464 of the application of the printer is sports clothes, a T-shirt, texture, or the like. A selection screen 594 (illustrated in FIGS. 13 to 15 described later) for the applications of the printer is displayed based on the information 464 of the applications of the printer.

The error log 470 is history information of a portion determined to be abnormal by the printing abnormality detection system 1. The error log 470 includes the foregoing abnormal printed portion information 580 and the like and may include history information on a mechanical abnormality of the printer 100 and the like.

Figure 12:
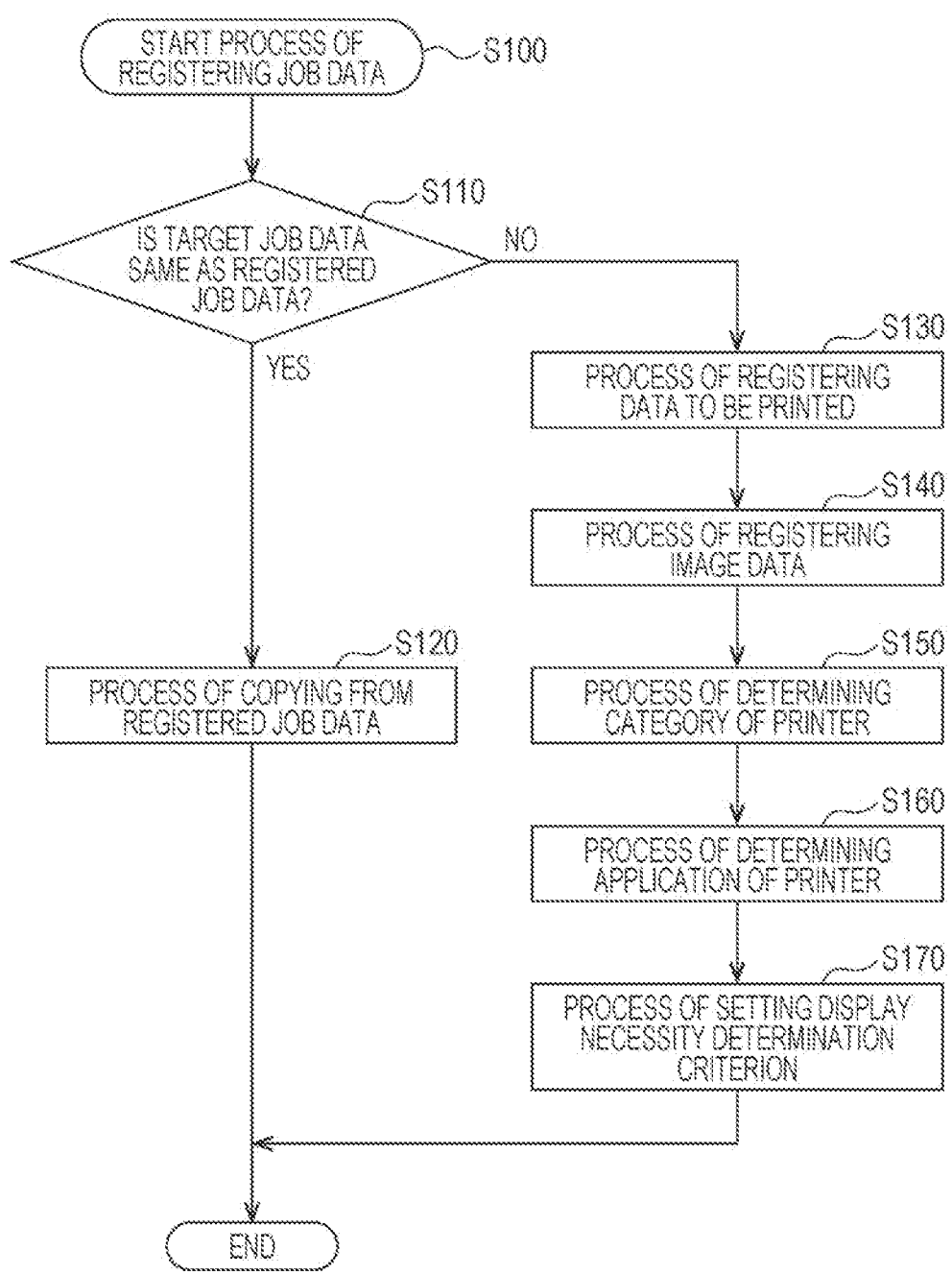
FIG. 12 is a flowchart illustrating an example of a process of registering job data.

Next, a specific method for determining the job data 410 is described. FIG. 12 is a flowchart illustrating an example of details of the process (step S100) of registering job data. The processing unit 300 determines whether job data to be registered is the same as registered data. When the job data to be registered is the same as the registered data (YES in step S110), the processing unit 300 executes a process (step S120) of copying from the registered job data and terminates the process of registering job data.

When the job data to be registered is not the same as the registered data (NO in step S110), the processing unit 300 executes a process (step S130) of registering data to be printed. Specifically, the user enters data of a new ID, a product name, a lot number, a job length, a printing condition, and the like, and the processing unit 300 executes a process of registering the data.

Next, the processing unit 300 executes a process (step S140) of registering the image data 420. Specifically, the processing unit 300 executes a process of associating the image data 420 on which the printing of an image on the printing medium W is based with the job data 410.

Figure 13:
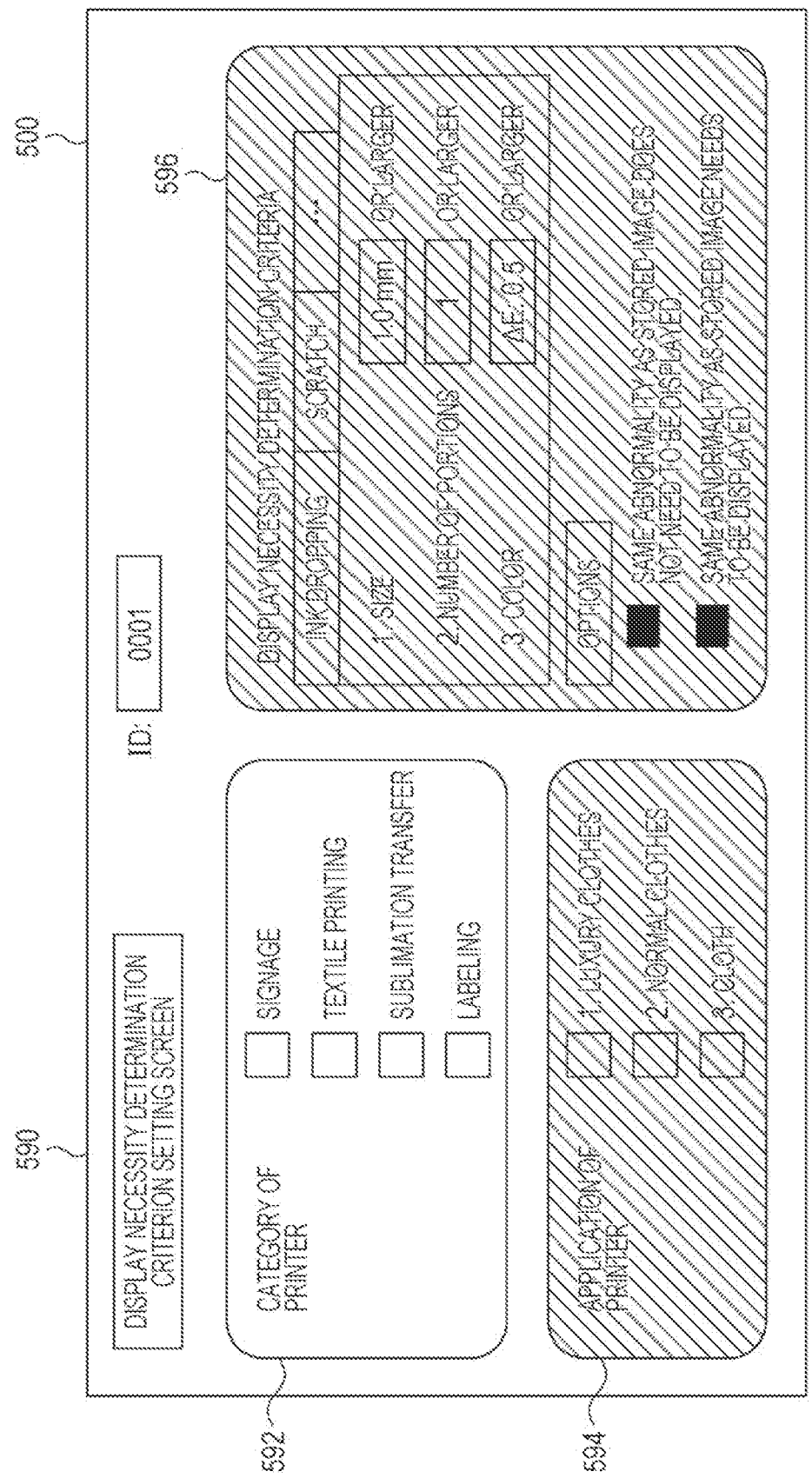
FIG. 13 is an explanatory diagram of a method for determining a display necessity determination criterion.

After that, the processing unit 300 executes a process (step S150) of determining the category of the printer. Specifically, a display necessity determination criterion setting screen 590 is displayed on the display unit 500 based on the information 462 of the category of the printer, as illustrated in FIG. 13. First, the user selects the category of the printer 100 from the selection screen 592 for the categories of the printer. In the embodiment, the categories of the printer 100 include two or more of signage, textile printing, sublimation transfer, and labeling. Specifically, for example, as illustrated in FIG. 13, the process of determining the category of the printer can be achieved by selecting, by the user, signage, textile printing, sublimation transfer, or labeling on the selection screen 592 for the categories of the printer. In this case, the printing abnormality detection system 1 can be used for a plurality of types of printers 100. Furthermore, even when the category of the printer 100 is changed, the printing abnormality detection system 1 can be continuously used.

Then, the processing unit 300 receives an input operation based on the selection by the user and executes the process of determining the category of the printer 100. During the time when the category of the printer 100 is not determined, a display necessity determination criterion 460 is not determined. For example, as illustrated in FIG. 13, details that have been lastly edited by the user are displayed on an edition screen 596 for the display necessity determination criteria, but can be achieved by locking edition to be performed by the user. Alternatively, the details of the edition screen 596 for the display necessity determination criteria may be set not to be displayed to the user.

As described above, in the storage unit 400, the display necessity determination criteria 460 are stored in the storage unit 400 for the information 462 of the respective categories of the printer. Therefore, when a selected category of the printer 100 is changed on the selection screen 592 for the categories of the printer, a detail of the edition screen 596 for the display necessity determination criteria is also changed. Specifically, the display necessity determination criteria 460 are changed for the respective categories of the printer 100.

Therefore, the process (illustrated in FIG. 17) of updating the display necessity determination criteria 460 is executed for the respective categories of the printer 100, but details of the update are described later.

Reference is made back to FIG. 12 to continue the description. The processing unit 300 executes a process (step S160) of determining the application of the printer. Specifically, the selection screen 594 (illustrated in FIG. 14) for the applications of the printer is displayed based on the information 464 of the applications of the printer, and the user selects the application of the printer 100.

Then, the processing unit 300 receives an input operation based on the selection by the user and executes a process of determining the application of the printer 100. During the time when the application of the printer 100 is not determined, a display necessity determination criterion 460 is not determined. However, the process of determining the application of the printer 100 can be achieved by a method that is the same as or similar to the method for determining the category of the printer 100.

As described above, the storage unit 400 stores the information of the display necessity determination criteria 460 including the determination criteria different for the applications of the printer 100. When a selected application of the printer 100 is changed on the selection screen 594 (illustrated in FIG. 14) for the applications of the printer, a detail of the edition screen 596 for the display necessity determination criteria is also changed. Specifically, the display necessity determination criteria 460 are changed for the respective applications of the printer 100. Therefore, the process (illustrated in FIG. 17) of updating the display necessity determination criteria 460 is executed for the respective applications of the printer 100, but details of the update are described later.

Figure 14:
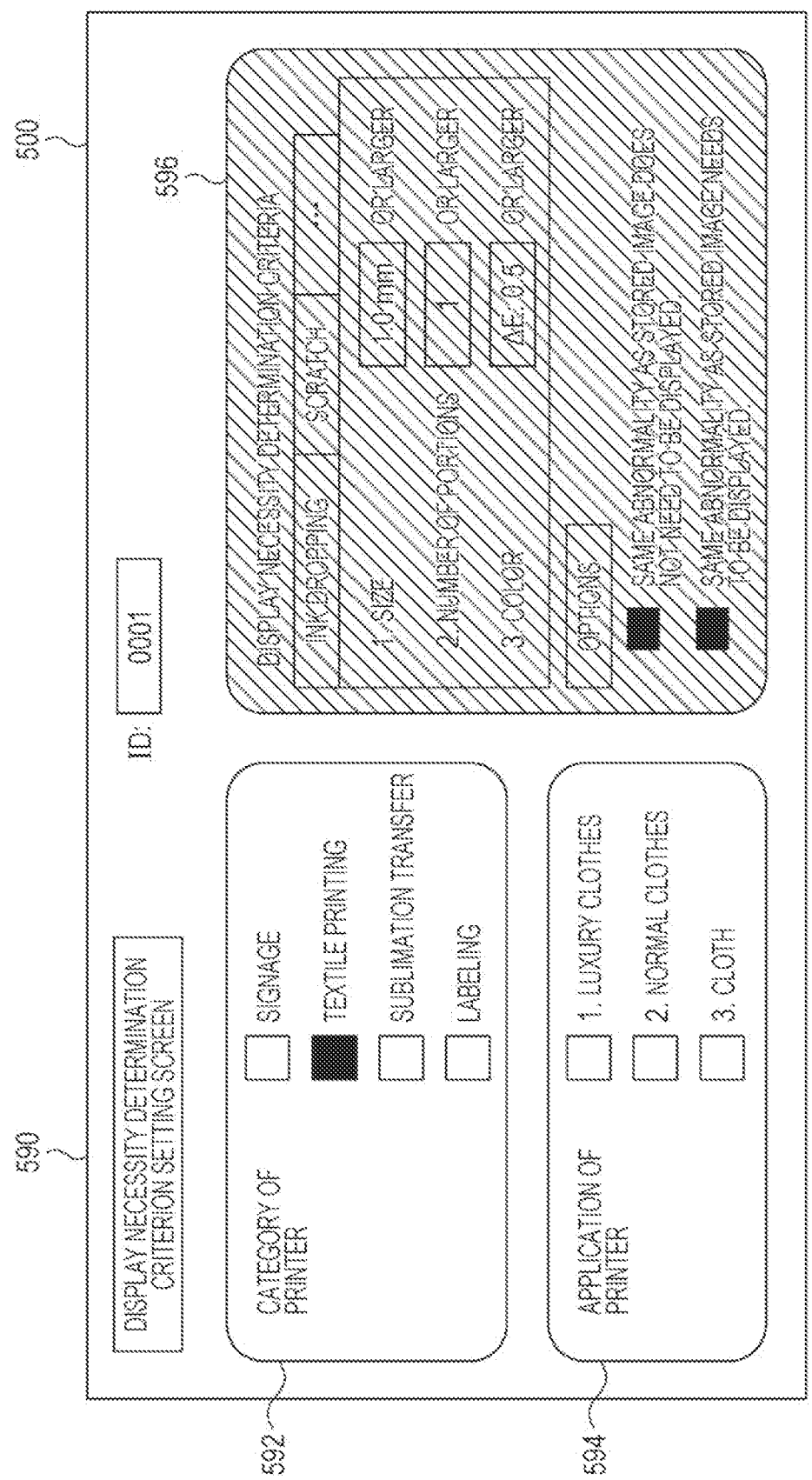
FIG. 14 is an explanatory diagram of the method for determining a display necessity determination criterion.
Figure 15:
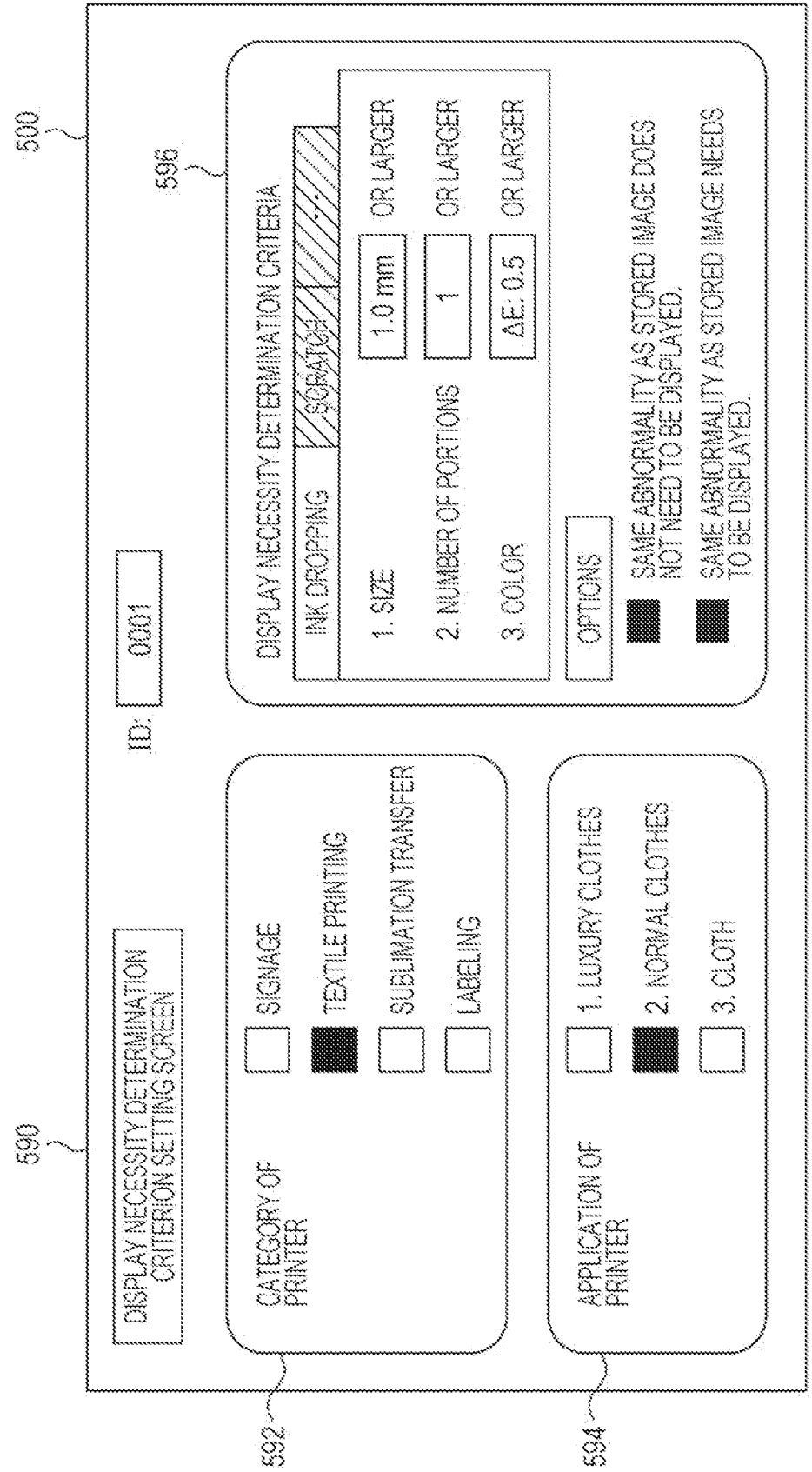
FIG. 15 is an explanatory diagram of the method for determining a display necessity determination criterion.

Reference is made back to FIG. 12 to continue the description. After that, the processing unit 300 executes a process (step S170) of setting a display necessity determination criterion 460. Specifically, as illustrated in FIG. 15, after the application of the printer 100 is determined, the edition screen 596 for the display necessity determination criterion for the category of the printer 100 and the application of the printer 100 is opened and the user can set an acceptable value for the display necessity determination criterion 460. Then, the user sets the predetermined acceptable value and the process of registering job data is terminated. On the edition screen 596 (illustrated in FIGS. 13 to 15) for the display necessity determination criterion, the acceptable value is set and displayed as a condition that is out of an acceptable range. However, on the edition screen 596 for the display necessity determination criterion, the acceptable value may be set and displayed as a condition that is in the acceptable range.

In the embodiment, when at least one of the category of the printer 100 and the application of the printer 100 is not set, a display necessity determination criterion 460 cannot be set. However, in a predetermined case, either the category of the printer 100 or the application of the printer 100 may not be set. The predetermined case is, for example, a case in which the number of categories of the printer 100 used by the user or the number of applications of the printer 100 used by the user is only 1, or the like.

In the embodiment, each of the display necessity determination criteria 460 is determined based on a combination of the category of the printer 100 and the application of the printer 100. However, each of the display necessity determination criteria 460 may be determined based on a combination of the category of the printer 100, the application of the printer 100, and another item. The other item is, for example, a print pattern, a medium color, or the like. The print pattern item may be divided into a pattern size and a pattern density.

The edition screen 596 for the display necessity determination criteria according to the embodiment is displayed for each of items for printing abnormality determination. The items for the printing abnormality determination are, for example, ink dropping, a scratch, the lack of a dot, ink scattering, unevenness, a streak, ink bleeding, distortion, and the like. However, the user may freely set and change the items for the printing abnormality determination.

The display necessity determination criteria 460 according to the embodiment include a criterion for determining a size, a criterion for determining the number of portions, a criterion for determining a color for each of the items for the printing abnormality determination. Specifically, as illustrated in FIG. 16, as the display necessity determination criteria 460, an acceptable value for a size, an acceptable value for the number of portions, and an acceptable value for a color are set for each of ink dropping, a scratch, the lack of a dot, ink scattering, unevenness, a streak, ink bleeding, and distortion that are the items for the printing abnormality determination. As illustrated in FIG. 15, the foregoing settings are achieved by displaying the acceptable values of the display necessity determination criteria 460 for the respective items for the printing abnormality determination on the edition screen 596 for the display necessity determination criteria. In this case, the printing abnormality determination can be executed more accurately.

On the edition screen 596 for the display necessity determination criteria, an acceptable value for a color is represented by ΔE indicating a color difference. A criterion for determining an abnormal color is a determination criterion relating to a color difference of the abnormal printed portions EA of the read image data 440 from the image data 420. Specifically, for example, a measurement value conforming to a predetermined color system is obtained by measuring the printing medium W2 by a colorimeter included in the reader 200, and the acceptable value can be achieved by calculating, as the color difference, a difference between the measurement value and a predetermined standard value, but may be achieved by another method. Therefore, it is possible to quantitatively determine a color-related abnormality that is hardly recognized by visual inspection. An acceptable value for a color difference can be set for each job data item, and thus it is possible to manage colors in various ways.

In FIG. 15, the display necessity determination criteria 460 are displayed for the respective items for the printing abnormality determination. However, each of the display necessity determination criteria 460 may be simultaneously displayed for two or more of the items for the printing abnormality determination. In FIGS. 13 to 15, the user is sequentially prompted to input data for each of the items. However, as illustrated in FIG. 16, the user may generate table data of the display necessity determination criteria 460 that includes a combination of the category of the printer 100, applications of the printer 100, and items for the printing abnormality determination, and the processing unit 300 may acquire the table data. In this case, it is possible to increase an operation efficiency at a printing site and prevent an incorrect operation. The table data illustrated in FIG. 16 indicates the case where the category of the printer 100 is only textile printing. However, similar table data may be generated for the other categories.

In the embodiment, the display necessity determination criteria 460 are displayed as numbers and can be updated by changing the set numbers as described later. However, the display necessity determination criteria 460 may be updated by adding images to the display necessity determination criteria 460. For example, as illustrated in FIG. 15, an optional specification for adding an image indicating no problem or a non-defective product even when a certain portion is detected as an abnormality based on a number set as a determination criterion may be added. Similarly, an optional specification for adding an image indicating an abnormality even when a certain product is determined as a non-defective product based on a value set as a determination criterion may be added.

3. Example of Process of Updating Display Necessity Determination Criterion

Figure 17:
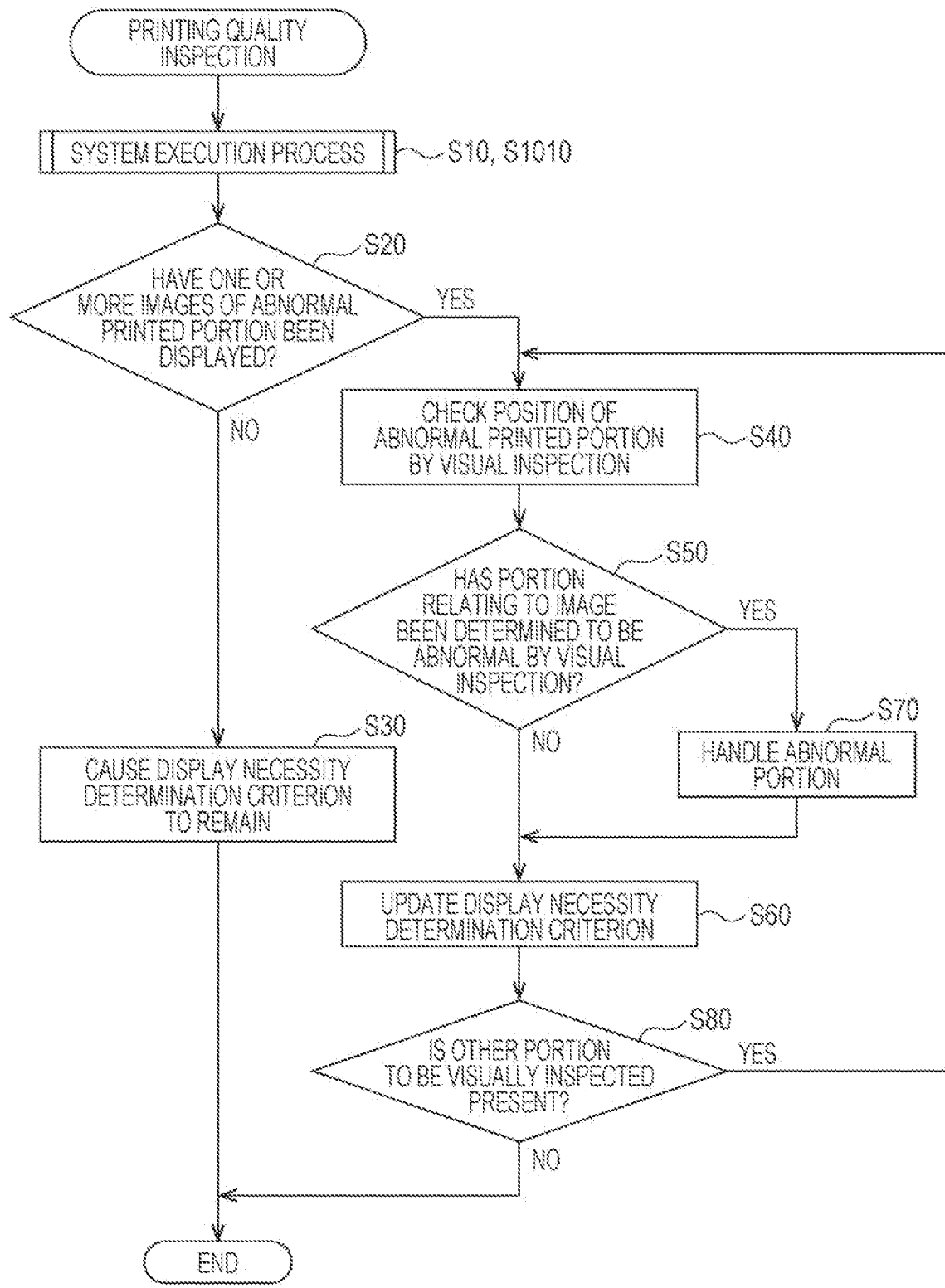
FIG. 17 is a flowchart describing an example of a procedure for printing quality inspection.

Next, an example of a process of updating a display necessity determination criterion 460 is described together with an example of a procedure for the printing quality inspection using the printing abnormality detection system 1. FIG. 17 is a flowchart illustrating the example of the procedure for the printing quality inspection to be performed by the user. First, the user uses the printing abnormality detection system 1 to perform the foregoing system execution process (step S10 or step S1010 described later).

When any image of an abnormal printed portion EA is not displayed (NO in step S20), the display necessity determination criterion 460 remains (step S30) and the printing quality inspection is terminated. Even in this case, visual inspection and checking may be regularly performed for maintenance of the system or the like.

When one or more images of an abnormal printed portion EA are displayed (YES in step S20), the user checks the position of the abnormal portion by visual inspection (step S40). Specifically, for example, when the abnormal portion identification image 564 of the image 540 of the reading information illustrated in FIG. 3 is selected, the transporting unit 120 transports the printing medium W in such a manner that the position of the abnormal portion matches the foregoing position A1 illustrated in FIG. 8.

When the abnormal portion is determined to be abnormal by visual inspection by the user (YES in step S50), The abnormal portion is handled (step S70). In this case, as the handling, the abnormal portion is partially repaired or removed.

On the other hand, when the portion relating to the image is not determined to be abnormal by the visual inspection or when the portion that has been determined to be abnormal based on the abnormal printed portion information 580 is not determined to be abnormal by the visual inspection by the user (NO in step S50), the processing unit 300 updates the display necessity determination criterion 460. In other words, the processing unit 300 receives user's input for the display of the abnormal printed portion information 580 and executes the process of updating the display necessity determination criterion 460 based on the user's input. Specifically, the user performs an operation of changing the value of the display necessity determination criterion 460 on the edition screen 596 (illustrated in FIG. 15) for the display necessity determination criteria. Then, the processing unit 300 receives the changing operation and executes a process of causing the changed value to be stored in the storage unit 400 again. When the portion relating to the image is determined to be abnormal by the visual inspection, or when the portion is determined to be abnormal based on the abnormal printed portion information 580 and determined to be abnormal by the visual inspection by the user (YES in step S50), the display necessity determination criterion 460 is updated for the portion in a predetermined case (step S60). The predetermined case is a case in which information of a reason for the abnormality is only information on a size even though both the size and a color are abnormal, or the like. Therefore, it is possible to improve the accuracy of the display necessity determination criterion 460 due to the addition of the determination by the user.

The processing unit 300 receives user's input for the display of the abnormal printed portion information 580 and updates the display necessity determination criteria 460 for the respective categories based on the categories of the printer 100 and a result of determining, by the user, whether displaying is to be executed. Specifically, as described above with reference to FIG. 13, the category of the printer 100 that is selected on the selection screen 592 for the categories of the printer coordinates with a detail of a display necessity determination criterion 460 that is displayed on the edition screen 596 for the display necessity determination criteria. Thus, the update of the display necessity determination criteria 460 on the edition screen 596 for the display necessity determination criteria is executed for the respective categories of the printer 100. Therefore, for example, even when a display necessity determination criterion 460 for textile printing selected as the category of the printer 100 is updated, a display necessity determination criterion 460 for signage as the category of the printer 100 is not updated. Thus, the display necessity determination criteria 460 can be individually updated for the respective categories of the printer 100. Therefore, even when the printer 100 of the printing abnormality detection system 1 is replaced with another printer, the user can easily manage the display necessity determination criteria 460.

The processing unit 300 receives user's input for the display of the abnormal printed portion information 580 and updates the display necessity determination criteria for the respective applications of the printer 100 based on the applications of the printer 100 and a result of determining, by the user, whether displaying is to be executed. Specifically, as described above with reference to FIG. 14, the application of the printer 100 that is selected on the selection screen 594 for the applications of the printer coordinates with a detail of a display necessity determination criterion 460 that is displayed on the edition screen 596 for the display necessity determination criteria. Thus, the update of the display necessity determination criteria 460 on the edition screen 596 for the display necessity determination criteria is executed for the respective applications of the printer 100. Therefore, for example, even when a display necessity determination criterion 460 for the case where the category of the printer 100 is textile printing and the application of the printer 100 is luxury clothes is updated, display necessity determination criteria 460 for the case where applications of the printer 100 are normal clothes and cloth are not updated. In this case, the display necessity determination criteria 460 can be individually updated for the respective applications of the printer. Even when a plurality of types of products to be used for different applications are produced in quantity by using the single printer 100, the display necessity determination criteria 460 can be managed for the respective applications of the printer 100 and thus it is possible to reduce the burden of the management on the user.

Reference is made back to FIG. 17 to continue the description. The user determines whether another portion that is among abnormal portions displayed on the display unit 500 and is to be visually inspected is present. When the other portion to be visually inspected is present (YES in step S80), the user performs visual inspection (step S40) again. When the other portion to be visually inspected is not present, the printing quality inspection is terminated.

Figure 18:
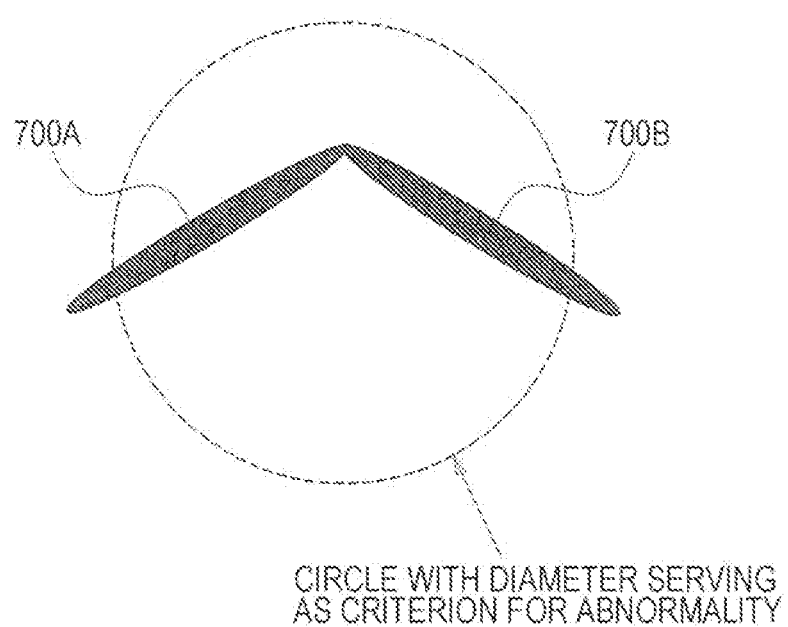
FIG. 18 is an explanatory diagram of an example of a printing abnormality that may be determined to be acceptable by visual inspection.

The display necessity determination criteria 460 may be updated by adding images or the like. For example, when a criterion for determining an abnormality relating to ink dropping is set in such a manner that an abnormality is displayed when the size of the abnormality is equal to or larger than 1.0 mm and the number of abnormalities is 1 or more, the printing abnormality detection system 1 detects an abnormality with a diameter of larger than 1.0 mm, as indicated by a dotted line in FIG. 18. However, the shape of the abnormality that is an ink drop is not limited to a circle. For example, as illustrated in FIG. 18, when two abnormal thin elliptical portions 700A and 700B overlap each other, the abnormal portions 700A and 700B may be present out of the circle indicated by the dotted line. In this case, the printing abnormality detection system 1 detects the abnormal portions as system abnormalities. However, the areas of the abnormal portions may be significantly smaller than that of the circle indicated by the dotted line in FIG. 18, and the abnormal portions may not be treated as abnormalities.

It is possible to improve the accuracy of the display necessity determination criteria 460 by storing, in the storage unit 400, such an image described above as the foregoing information 466 of the options. On the other hand, even when a size of an abnormal portion is equal to or smaller than a standard value of a display necessity determination criterion, the abnormal portion may be treated as an abnormal printed portion EA by registering a predetermined image, although not illustrated. The predetermined image is, for example, an image of a portion in which any abnormality is not acceptable, or the like.

The processing unit 300 may automatically change the acceptable values of the display necessity determination criteria 460. For example, the processing unit 300 includes a predetermined program. When the user continuously enters a result indicating "acceptable" or "not acceptable" for an abnormal portion detected by the printing abnormality detection system in visual inspection by the user, the processing unit 300 executes learning based on the program and updates the acceptable values of the display necessity determination criteria 460 to appropriate values. In this manner, the processing unit 300 receives and learns a result of determination by visual inspection performed on a displayed abnormal printed portion EA and executes, based on a result of the learning, a process of updating the display necessity determination criteria 460. In this case, the user does not need to change the values of the display necessity determination criteria 460, and it is possible to reduce burden on the user.

4. Other Modifications

As described with reference to FIG. 8 and the like, the reader 200 is installed at a different position from the position of the printing unit 140, but may be installed in the same region in which the printing unit 140 is present. For example, although not illustrated, a reading device may be installed in the carriage 142 of the printing unit 140. In this case, it is not necessary to secure a region in which the reader 200 is installed, and it is possible to reduce a region for the configuration of the printing abnormality detection system 1.

Figure 19:
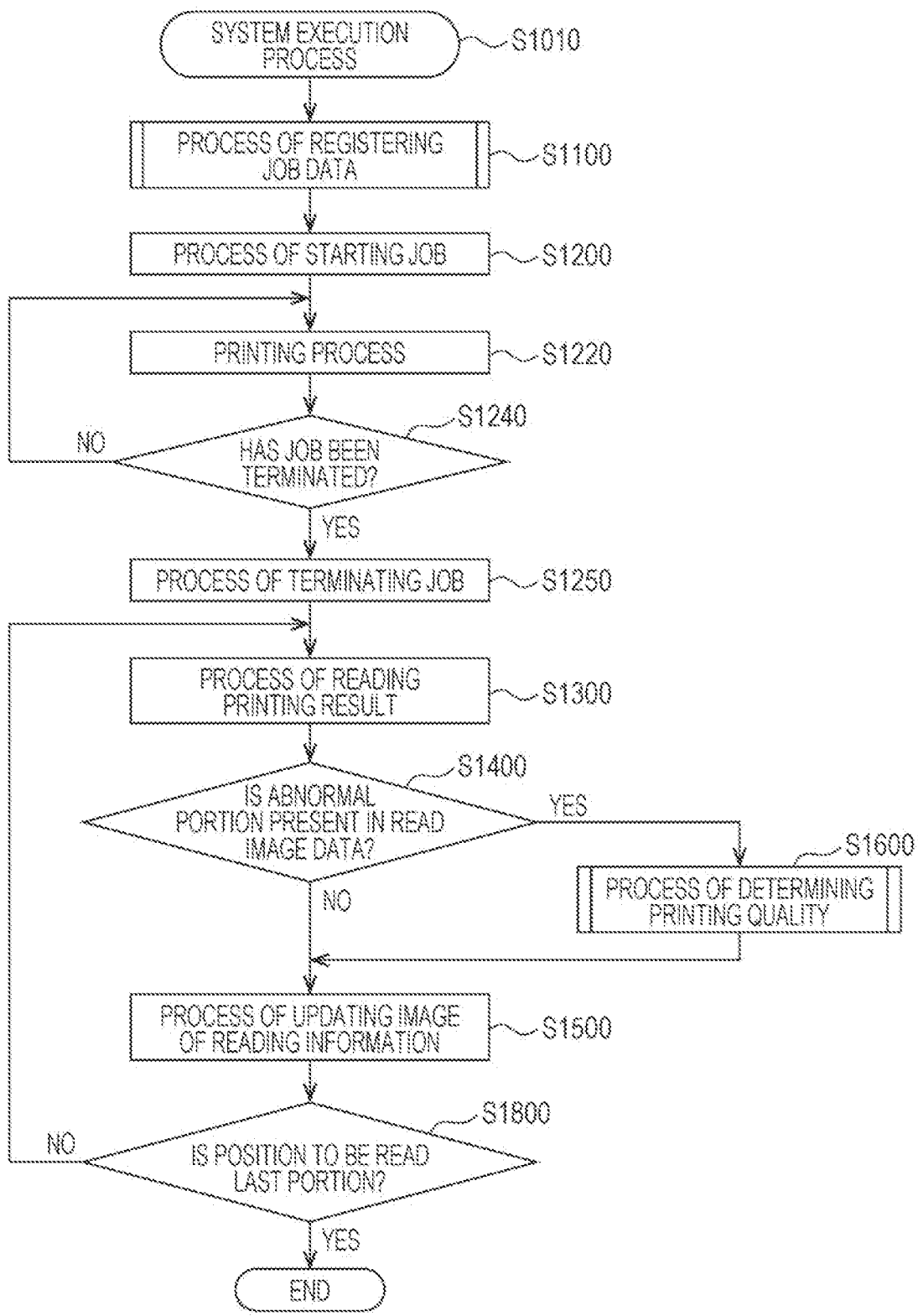
FIG. 19 is a flowchart describing a modification of the system execution process.

As described above, the process (step S300 illustrated in FIG. 5) of reading a printing result is executed together with the printing process in real time, but may be executed after the termination of the printing process. FIG. 19 is a flowchart illustrating a modification of the foregoing system execution process illustrated in FIG. 5. In this case, the system execution process is indicated by step S1010. In the following description, the same processes as those described with reference to FIG. 5 are not described.

The processing unit 300 executes a process (step S1100) of registering job data in the same manner as the foregoing step S100. Next, the processing unit 300 executes a process (step S1200) of starting a job in the same manner as the foregoing step S200. The processing unit 300 executes a printing process (step S1220) in the same manner as the foregoing step S220 until the job is terminated (YES in step S1240). After that, the processing unit 300 executes a process (step S1250) of terminating the job. Specifically, for example, the processing unit 300 executes a process of keeping a log indicating the completion of the print job, a process of stopping a printing operation of the printer 100, and the like.

After executing the process (step S1250) of terminating the job, the processing unit 300 executes a process (step S1300) of reading a printing result in the same manner as the foregoing step S300. Specifically, the reading process can be achieved by reading the printing result by the reader 200 while the printing medium W2 wound by the winder 124 is transported toward a direction opposite to the foregoing direction D1. The printing medium W2 after the reading may be wound by the feeder 122 or wound at a different position from the feeder 122.

When the processing unit 300 determines that an abnormal portion is not present in read image data (NO in step S1400) in the same manner as the foregoing step S400, the processing unit 300 executes a process (step S1500) of updating the image of the reading information in the same manner as the foregoing step S500. On the other hand, when the processing unit 300 determines that the abnormal portion is present in the read image data (YES in step S1400), the processing unit 300 executes a process (step S1600) of determining a printing quality in the same manner as the foregoing step S600. After that, the processing unit 300 executes the foregoing process (step S1500) of updating the image of the reading information.

After executing the process (step S1500) of updating the image of the reading information, the processing unit 300 determines whether a portion to be read is the last portion. When the portion to be read is not the last portion (NO in step S1800), the processing unit 300 continuously executes the process (step S1300) of reading the printing result. When the portion to be read is the last portion (YES in step S1800), the processing unit 300 terminates the system execution process (step S1010).

In this case, a process load of the printing abnormality detection system 1 is distributed, compared to the case where the process of reading a printing result and the like are executed in real time. Therefore, the printing abnormality detection system 1 can stably operate.

As described above, the printing abnormality detection system according to the embodiment includes the printer that prints an image on a printing medium based on image data, the reader that reads the image printed on the printing medium, the processing unit that detects an abnormal printed portion based on read image data from the reader, the storage unit that stores information of a display necessity determination criterion, and the display unit. The processing unit determines, based on the display necessity determination criterion, whether an abnormal printed portion is to be displayed on the display unit. When the processing unit determines that the abnormal printed portion is to be displayed, the processing unit executes a process of displaying, on the display unit, abnormal printed portion information including an image of the abnormal printed portion.

According to this configuration, a user can check the position of the abnormal printed portion and the image of the abnormal printed portion. Therefore, even when a long job for textile printing is executed, it is possible to easily identify an abnormal printed portion. Specifically, when printing is executed for a long and large job, it is possible to provide the printing abnormality detection system and the like that can efficiently detect and handle a printing failure.

The storage unit may store information of the display necessity determination criterion including determination criteria different for categories of the printer. In this case, the printing abnormality detection system can be used for a plurality of types of printers. Even when the category of the printer is changed, the printing abnormality detection system can be continuously used.

The categories of the printer may include two or more of signage, textile printing, sublimation transfer, and labeling. In this case, the printing abnormality detection system can be used for a plurality of types of printers. Even when the category of the printer is changed, the printing abnormality detection system 1 can be continuously used.

The processing unit may receive user's input for the display of the abnormal printed portion information and update the display necessity determination criteria for the respective categories based on the categories of the printer and a result of determining, by the user, whether displaying is to be executed. In this case, the display necessity determination criteria can be individually updated for the respective categories of the printer. Therefore, even when the printer of the printing abnormality detection system is replaced with another printer, the user can easily manage the display necessity determination criteria.

The storage unit may store information of the display necessity determination criterion including determination criteria different for applications of the printer. In this case, since the display necessity determination criteria can be set for the respective applications of the printer, the user can easily manage the display necessity determination criteria.

The processing unit may receive user's input for the display of the abnormal printed portion information and update the display necessity determination criteria for the respective applications of the printer based on the applications of the printer and a result of determining, by the user, whether displaying is to be executed. In this case, the display necessity determination criteria can be individually updated for the respective applications of the printer. Therefore, even when a plurality of types of products to be used for different applications are produced in quantity by using a single printer, the display necessity determination criteria can be managed for the respective applications of the printer 100 and thus it is possible to reduce the burden of the management on the user.

The display necessity determination criterion may include at least one of a criterion for determining a size of the abnormal printed portion, a criterion for determining the number of abnormal printed portions, and a criterion for determining a color of the abnormal printed portion. In this case, it is possible to accurately execute the printing abnormality determination.

The criterion for determining a color may be a determination criterion relating to a color difference of the abnormal printed portion of the read image data from the image data. In this case, it is possible to quantitatively determine an abnormality relating to a color, although it is difficult to quantitatively determine the abnormality by visual inspection. Since an acceptable value for a color difference can be set for each job data item, it is possible to manage colors in various ways.

The processing unit may receive user's input for the display of the abnormal printed portion information and execute the process of updating the display necessity determination criterion based on the user's input. In this case, since determination by the user is added, it is possible to improve the accuracy of the display necessity determination criterion.

The processing unit may receive and learn a result of determination made by visual inspection of a displayed abnormal printed portion and execute the process of updating the display necessity determination criterion based on a result of the learning. In this case, since the user does not need to change the value of the display necessity determination criterion, it is possible to reduce burden on the user.

The printing abnormality detection method according to the embodiment relates to a printing abnormality detection method including determining, based on image data, read image data, and a display necessity determination criterion, whether an abnormal printed portion is to be displayed on a display unit, and displaying, on a display unit, abnormal printed portion information including an image of the abnormal printed portion when it is determined that the abnormal printed portion is to be displayed.

Although the embodiment is described above, a person skilled in the art can easily understand that many modifications that do not substantially depart from the novel matters and effects of the present disclosure can be made. Therefore, such modifications are intended to be included in the scope of the present disclosure. For example, a term described at least once together with a different term having a broader meaning or the same meaning in the specification or the drawings can be replaced with the different term anywhere in the specification or the drawings. All combinations of the embodiment and the modifications are also included in the scope of the present disclosure. The configurations and operations of the printing abnormality detection system and the printing abnormality detection method are not limited to those described in the embodiment and can be variously modified.

What is claimed is:

1. A printing abnormality detection system comprising:
   a printer that prints an image on a printing medium based on image data;
   a reader that reads the image printed on the printing medium;
   a processing unit that detects an abnormal printed portion based on read image data from the reader;
   a storage unit that stores information of a display necessity determination criterion; and
   a display unit, wherein
   the processing unit determines, based on the image data, the read image data, and the display necessity determination criterion, whether the abnormal printed portion is to be displayed on the display unit, and
   when the processing unit determines that the abnormal printed portion is to be displayed, the processing unit executes a process of displaying, on the display unit, abnormal printed portion information including an image of the abnormal printed portion.

2. The printing abnormality detection system according to claim 1, wherein,
   the storage unit stores information of the display necessity determination criterion including determination criteria different for categories of the printer.

3. The printing abnormality detection system according to claim 2, wherein,
   the categories of the printer include two or more of signage, textile printing, sublimation transfer, and labeling.

4. The printing abnormality detection system according to claim 2, wherein
   the processing unit receives user's input for the display of the abnormal printed portion information and updates the display necessity determination criteria for the respective categories based on the categories of the printer and a result of determining, by the user, whether displaying is to be executed.

5. The printing abnormality detection system according to claim 1, wherein
   the storage unit stores information of the display necessity determination criterion including determination criteria different for applications of the printer.

6. The printing abnormality detection system according to claim 5, wherein
   the processing unit receives user's input for the display of the abnormal printed portion information and updates the display necessity determination criteria for the respective applications based on the applications of the printer and a result of determining, by the user, whether displaying is to be executed.

7. The printing abnormality detection system according to claim 1, wherein
   the display necessity determination criterion includes at least one of a criterion for determining a size of the abnormal printed portion, a criterion for determining the number of abnormal printed portions, and a criterion for determining a color of the abnormal printed portion.

8. The printing abnormality detection system according to claim 7, wherein
   the criterion for determining the color is a determination criterion relating to a color difference of the abnormal printed portion of the read image data from the image data.

9. The printing abnormality detection system according to claim 1, wherein
   the processing unit receives user's input for the display of the abnormal printed portion information and executes a process of updating the display necessity determination criterion based on the user's input.

10. The printing abnormality detection system according to claim 1, wherein
    the processing unit receives and learns a result of determination made by visual inspection of the displayed abnormal printed portion and executes a process of updating the display necessity determination criterion based on a result of the learning.

11. A printing abnormality detection method comprising:
    printing an image on a printing medium based on image data;
    reading the image printed on the printing medium to acquire read image data;
    detecting an abnormal printed portion based on the read image data;

determining, based on the image data, the read image data, and a display necessity determination criterion, whether the abnormal printed portion is to be displayed on a display unit; and displaying, on the display unit, abnormal printed portion information including an image of the abnormal printed portion when it is determined that the abnormal printed portion is to be displayed.

* * * * *